United States Patent
Kanatzidis et al.

(10) Patent No.: US 8,143,181 B2
(45) Date of Patent: Mar. 27, 2012

(54) NONLINEAR OPTIC GLASSY FIBER, METHODS OF MAKING AND APPLICATIONS OF THE SAME

(75) Inventors: Mercouri G. Kanatzidis, Wilmette, IL (US); In Chung, Evanston, IL (US)

(73) Assignee: Northwestern University, Evanston, IL (US)

( * ) Notice: Subject to any disclaimer, the term of this patent is extended or adjusted under 35 U.S.C. 154(b) by 409 days.

(21) Appl. No.: 12/436,409

(22) Filed: May 6, 2009

(65) Prior Publication Data

US 2010/0292065 A1 Nov. 18, 2010

Related U.S. Application Data

(60) Provisional application No. 61/050,786, filed on May 6, 2008.

(51) Int. Cl.
*C03C 3/32* (2006.01)
*C03C 10/02* (2006.01)

(52) U.S. Cl. ............. 501/40; 501/10; 385/123; 385/129

(58) Field of Classification Search .................... 501/10, 501/40; 385/123, 129
See application file for complete search history.

(56) References Cited

U.S. PATENT DOCUMENTS

| | | | |
|---|---|---|---|
| 4,061,484 A | 12/1977 | Aulich et al. | |
| 4,173,459 A | 11/1979 | Aulich et al. | |
| 4,708,942 A * | 11/1987 | Nishiii et al. | 501/40 |
| 5,100,449 A | 3/1992 | Cornelius et al. | |
| 6,413,891 B1 | 7/2002 | Cho et al. | |

OTHER PUBLICATIONS

Chung et al., APSe$_6$ (A=K, Rb, and Cs): Polymeric Selenophosphates with Reversible Phase-Change Properties, Inorg. Chem., vol. 43, No. 9, Apr. 3, 2004, pp. 2762-2764.
Chung et al., Helical Polymer $^1/_\infty$[P$_2$Se$_6^2$]: Strong Second Harmonic Generation Response and Phase-Change Properties of Its K and Rb Salts, J. Am. Chem. Soc., vol. 129, No. 48, Nov. 8, 2007, pp. 14996-15006.
Chung et al., Low valent phosphorus in the molecular anions [P$_5$Se$_{12}$]$^{5-}$ and β-[P$_6$Se$_{12}$]$^{4-}$: phase change behavior and near infrared second harmonic generation, Chem. Commun., Nov. 12, 2007, pp. 4998-5000.

* cited by examiner

*Primary Examiner* — Karl Group
*Assistant Examiner* — Elizabeth A Bolden
(74) *Attorney, Agent, or Firm* — Bell & Manning, LLC

(57) ABSTRACT

A process for producing an optical glass fiber from crystal-glass phase material. In one embodiment, the process includes the step of providing a molten crystal-glass phase material in a container, wherein the temperature of the molten crystal-glass phase material is at or above the melting temperature of the molten crystal-glass phase material, $T_m$, to allow the molten crystal-glass phase material is in liquid phase. The process further includes the step of cooling the molten crystal-glass phase material such that the temperature of the molten crystal-glass phase material, $T_1$, is reduced to below $T_m$ to cause the molten crystal-glass phase material to be changed from the liquid phase to a viscous melt. Moreover, the process has the step of pulling a glass fiber of the crystal-glass phase material from the viscous melt, wherein $T_1$ satisfies the following relationship: $T_v<T_1<T_m$, and $T_v$ being the temperature at which the vitrification of the viscous melt of the crystal-glass phase material occurs, and wherein the crystal-glass phase material is characterized by having a reversible thermal behavior.

11 Claims, 21 Drawing Sheets

A

B

C

NONLINEAR OPTIC GLASSY FIBER, METHODS OF MAKING AND APPLICATIONS OF THE SAME

CROSS-REFERENCE TO RELATED PATENT APPLICATION

This application claims the benefit, pursuant to 35 U.S.C. §119(e), of U.S. provisional patent application Ser. No. 61/050,786, filed May 6, 2008, entitled "Nonlinear Optic Glassy Fiber Using Noncentrosymmetric Crystal-Glass Phase-Change Alkali Chalcophosphate Materials" by In Chung and Mercouri G. Kanatzidis, which is incorporated herein by reference in its entirety.

STATEMENT OF FEDERALLY-SPONSORED RESEARCH

This invention was made with government support under Grant No. DMR-0702911 and No. DMR-0801855 awarded by the National Science Foundation. The government has certain rights in the invention.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "(n)" represents the nth reference cited in the reference list. For example, (1) represents the 1st reference cited in the reference list, namely, Chung I, Do J, Canlas C G, Weliky D P, Kanatzidis M G, Inorganic Chemistry 43 (9): 2762-2764 May 3 2004.

FIELD OF THE INVENTION

The present invention relates generally to a process for producing an optical article, such as glass fiber or glassy or crystallized film, from crystal-glass phase material, which exhibit strong second harmonic generation (SHG) and waveguide performance, and the resultant materials and applications of same.

BACKGROUND OF THE INVENTION

Second harmonic generation (SHG) is a nonlinear optic process. When light of frequency $\omega$ is irradiated onto nonlinear crystal that adopts noncentrosymmetric space group, the doubled frequency $2\omega$ is emitted. Frequency conversion by nonlinear optic crystal is an effective way of producing coherent light at frequencies where lasers perform poorly or are unavailable. Demand on SHG materials for IR application is rapidly growing. Chalcogenide glasses are of interest because of their infrared transparency and excellent formability, consequently being promising contenders for infrared optical fiber. Meanwhile, glasses are inherently forbidden from showing nonlinear optic ("NLO") second harmonic generation because of they are random and the presence of macroscopic center of symmetry. For example, Silica fibers play a main role of optical switches, routers, splitters, modulators, and waveguidance in current optical communications and rapidly growing high speed broadband internet. However, its usefulness is greatly limited to be passive devices because of its lack of second-order nonlinearity. It is not an SHG NLO material. Therefore, there have been tremendous efforts to induce SHG in glass using specific treatments such as thermal electric field poling, electron beam irradiation, and so on. It does need complicated processes and any induced SHG is much weaker than normal NLO crystals.

Most of the known SHG materials are oxide compounds and they have been extensively studied. Their performance is suitable for Uv-vis region but they are inefficient in the IR region because of the absorption problem in this region. In terms of SHG susceptibility, oxide nonlinear optic materials are poorer than chalcogenide species because chalcogen atoms (S, Se, Te) are more polarizable than oxygen.

Chalcogenide or chalcopyrite compounds exhibited excellent SHG response and broad transparency through infrared region. $CdGeAs_2$, $ZnGeP_2$, $AgGaQ_2$ (Q=S, Se) are among top materials. $CdGeAs_2$ ranks first in the SHG susceptibility before the introduction of $APSe_6$ and $A_2P_2Se_6$ by the inventors as set forth below.

The application of $CdGeAs_2$ however is very limited. The compound consists of toxic elements such as Cd and As, and it is very difficult to grow single crystals. The crystals show anisotropic thermal expansion allowing cracking. Due to the small band gap, its transparency range is only 2.4 to 17 μm, consequently Nd:YAG and GaAs laser are unavailable for use in conjunction with $CdGeAs_2$ and only $CO_2$ laser can be used. $AgGaQ_2$ (Q=S, Se) are the other contenders but they show anisotropic thermal expansion problem and the sulfur analogue suffers from low SHG susceptibility. Despite this $AgGaSe_2$ is a commercially available NLO material for the infrared.

Therefore, a heretofore unaddressed need exists in the art to address the aforementioned deficiencies and inadequacies.

SUMMARY OF THE INVENTION

The present invention, in one aspect, relates to a process for producing an optical glass fiber from crystal-glass phase material. In one embodiment, the process includes the steps of providing a molten crystal-glass phase material in a container, wherein the temperature of the molten crystal-glass phase material is at or above the melting temperature of the molten crystal-glass phase material, $T_m$, to allow the molten crystal-glass phase material is in liquid phase; cooling the molten crystal-glass phase material such that the temperature of the molten crystal-glass phase material, $T_1$, is reduced to below $T_m$ such that the molten crystal-glass phase material is changed from the liquid phase to a viscous melt; and pulling a glass fiber of the crystal-glass phase material from the viscous melt, wherein $T_1$ satisfies the following relationship: $T_v<T_1<T_m$, and $T_v$ being the temperature at which the vitrification of the viscous melt of the crystal-glass phase material occurs, and wherein the crystal-glass phase material is characterized by having a reversible thermal behavior.

The crystal-glass phase material comprises one or more noncentrosymmetric crystal-glass phase-change materials, wherein the noncentrosymmetric crystal-glass phase-change materials comprise chalcophosphate and chalcogenide materials that are structurally one-dimensional. In one embodiment, the chalcophosphate and chalcogenide materials that are structurally one-dimensional each comprise one or more compounds of $A_{1-x}A'_xPSe_6S_{6-y}$ (A, A'=K, Rb, Tl, Ag, Cu; $0 \leq x<1$; $0 \leq y<6$), $A_{2-x}A'_xP_2Se_6S_{6-y}$ (A, A'=K, Rb, Cs, Tl, Ag, Cu; $0 \leq x<1$; $0 \leq y<6$), and $A_{1-x}A'_xPSe_z$ (A, A'=K, Rb, Cs, Tl, Ag, Cu; $0 \leq x<1$; $6<z<12$).

The chalcophosphate and chalcogenide materials that are structurally one-dimensional each comprise at least a part of a polymeric $\frac{1}{\infty}[PSe_6^-]$ chain, an extended helical chain of $\frac{1}{\infty}[P_2Se_6^{2-}]$, or an $Se_z$ ($6 < z < 12$) chain forming a glassy compound.

In one embodiment, the step of providing a molten crystal-glass phase material in a container includes the steps of mixing at least one of the compounds in polar organic solvents such as anhydrous hydrazine solution to form a mixture; and heating the mixture so that it melts into liquid phase.

The reversible thermal behavior of the crystal-glass phase material is that upon heating, the crystal-glass phase material crystallizes first and then subsequently melts when the temperature is at or above the melting temperature of the molten crystal-glass phase material, $T_m$, while upon cooling, the vitrification of the viscous melt of the crystal-glass phase material occurs instead of the recrystallization of the crystal-glass phase material.

The $T_m$ is less than 300° C.

In one embodiment, the temperature during said pulling ranges from about 220° C. to 280° C.

The glass fiber of the crystal-glass phase material made by the process according to the present invention exhibits intrinsic second-order nonlinear optic properties and useable in a nonlinear optic or ferroelectric article.

The present invention, in another aspect, relates to a process for producing an optical film from crystal-glass phase material. In one embodiment, the process includes the steps of mixing at least one of crystal-glass phase materials and the compounds in anhydrous hydrazine to form a solution; applying the solution to a substrate to form a film of the solution over a surface of the substrate; and annealing the film of the solution over a surface of the substrate at a first temperature sufficiently high to remove the hydrazine to allow a film of the at least one of crystal-glass phase materials to be formed in glass phase, wherein the crystal-glass phase material is characterized by having a reversible thermal behavior.

The crystal-glass phase material comprises one or more noncentrosymmetric crystal-glass phase-change materials, wherein the noncentrosymmetric crystal-glass phase-change materials comprise chalcophosphate and chalcogenide materials that are structurally one-dimensional. In one embodiment, the chalcophosphate and chalcogenide materials that are structurally one-dimensional each comprise one or more compounds of $A_{1-x}A'_xPSe_6S_{6-y}$ (A, A'=K, Rb, Tl, Ag, Cu; $0 \leq x < 1$; $0 \leq y < 6$), $A_{2-x}A'_xP_2Se_6S_{6-y}$ (A, A'=K, Rb, Cs, Tl, Ag, Cu; $0 \leq x < 1$; $0 \leq y < 6$), and $A_{1-x}A'_xPSe_z$ (A, A'=K, Rb, Cs, Tl, Ag, Cu; $0 \leq x < 1$; $6 < z < 12$).

The chalcophosphate and chalcogenide materials that are structurally one-dimensional each comprise at least a part of a polymeric $\frac{1}{\infty}[PSe_6^-]$ chain, an extended helical chain of $\frac{1}{\infty}[P_2Se_6^{2-}]$, or an $Se_z$ ($6 < z < 12$) chain forming a glassy compound.

In one embodiment, the first temperature during said annealing ranges from about 100° C. to 130° C. The glassy film of the crystal-glass phase material made by the process exhibits intrinsic second-order nonlinear optic properties and useable in a nonlinear optic or ferroelectric article.

In another embodiment, the process further includes a step of further annealing the glassy film at a second temperature about twice higher than said first temperature to allow the glassy film to crystallize into a crystallized film. In one embodiment, the second temperature during said further annealing ranges from about 250° C. to 300° C. The time of said further annealing ranges from about 2 to 15 minutes. The crystallized film of the crystal-glass phase material made by the process exhibits intrinsic second-order nonlinear optic properties and useable in a nonlinear optic or ferroelectric article.

The present invention, in yet another aspect, relates to a glass fiber made from one or more crystal-glass phase material, wherein the crystal-glass phase material is characterized by having a reversible thermal behavior. The crystal-glass phase material comprises one or more noncentrosymmetric crystal-glass phase-change materials, wherein the noncentrosymmetric crystal-glass phase-change materials comprise chalcophosphate and chalcogenide materials.

The present invention, in a further aspect, relates to a glassy or crystallized film made from one or more crystal-glass phase material, wherein the crystal-glass phase material is characterized by having a reversible thermal behavior. The crystal-glass phase material comprises one or more noncentrosymmetric crystal-glass phase-change materials, wherein the noncentrosymmetric crystal-glass phase-change materials comprise chalcophosphate and chalcogenide materialsthat are structurally one-dimensional. In one embodiment, the chalcophosphate and chalcogenide materials that are structurally one-dimensional each comprise one or more compounds of $A_{1-x}A'_xPSe_6S_{6-y}$ (A, A'=K, Rb, Tl, Ag, Cu; $0 \leq x < 1$; $0 \leq y < 6$), $A_{2-x}A'_xP_2Se_6S_{6-y}$ (A, A'=K, Rb, Cs, Tl, Ag, Cu; $0 \leq x < 1$; $0 \leq y < 6$), and $A_{1-x}A'_xPSe_z$ (A, A'=K, Rb, Cs, Tl, Ag, Cu; $0 \leq x < 1$; $6 < z < 12$).

The chalcophosphate and chalcogenide materials that are structurally one-dimensional each comprise at least a part of a polymeric $\frac{1}{\infty}[PSe_6^-]$ chain, an extended helical chain of $\frac{1}{\infty}[P_2Se_6^{2-}]$, or an $Se_z$ ($6 < z < 12$) chain forming a glassy compound.

The present invention, in yet another aspect, relates to a glassy or crystal compound made from one or more noncentrosymmetric crystal-glass phase-change materials. The noncentrosymmetric crystal-glass phase-change materials each comprise chalcophosphate and chalcogenide materials that are structurally one-dimensional. In one embodiment, the chalcophosphate and chalcogenide materials that are structurally one-dimensional each comprise one or more compounds of $A_{1-x}A'_xPSe_6S_{6-y}$ (A, A'=K, Rb, Tl, Ag, Cu; $0 \leq x < 1$; $0 \leq y < 6$), $A_{2-x}A'_xP_2Se_6S_{6-y}$ (A, A'=K, Rb, Cs, Tl, Ag, Cu; $0 \leq x < 1$; $0 \leq y < 6$), and $A_{1-x}A'_xSe_z$ (A, A'=K, Rb, Cs, Tl, Ag, Cu; $0 \leq x < 1$; $6 < z < 12$).

The chalcophosphate and chalcogenide materials that are structurally one-dimensional each comprise at least a part of a polymeric $\frac{1}{\infty}[PSe_6^-]$ chain, an extended helical chain of $\frac{1}{\infty}[P_2Se_6^{2-}]$, or an $Se_z$ ($6 < z < 12$) chain forming a glassy compound.

The glassy or crystal compounds of the present invention can be used in a nonlinear optic or ferroelectric article.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
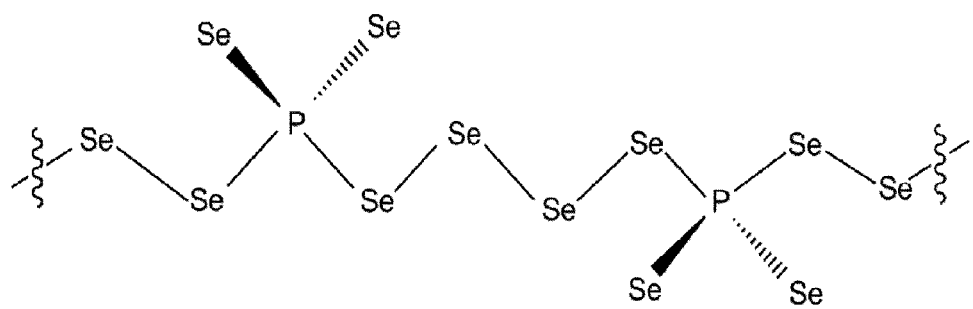
FIG. 1 illustrates structure of the polymeric anions:
(A) $^1_\infty[PSe_6^-]$ in KPSe6, (B) $^1_\infty[PSe_8^-]$ in KPSe$_8$, and (C) $^1_\infty[P_2Se_6^{2-}]$ in K$_2$P$_2$Se$_6$.
Figure 1:
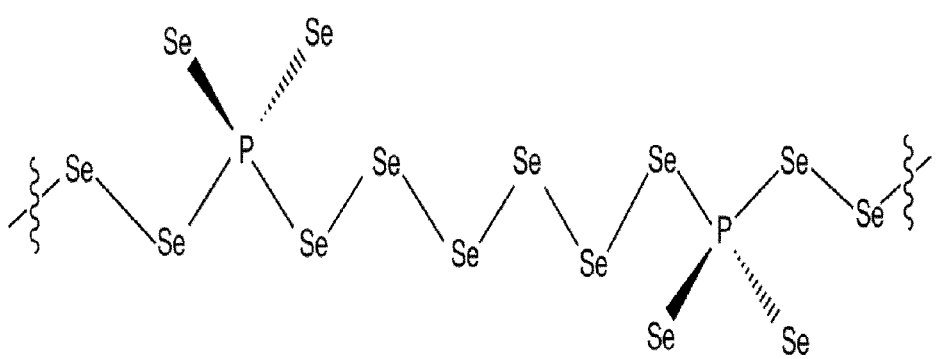
Figure 1:
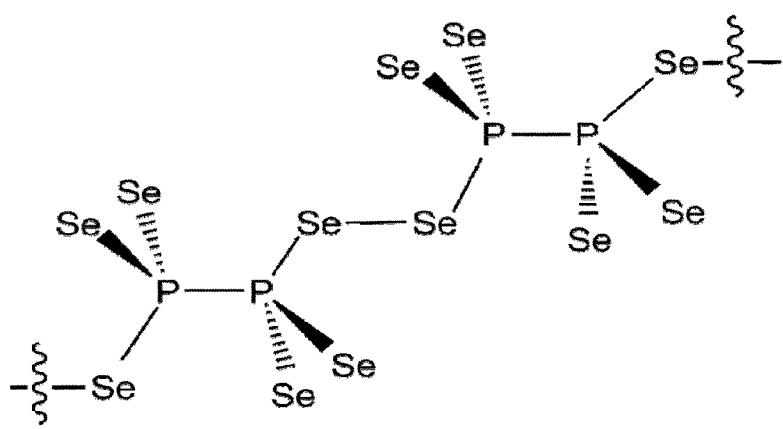
Figure 2:
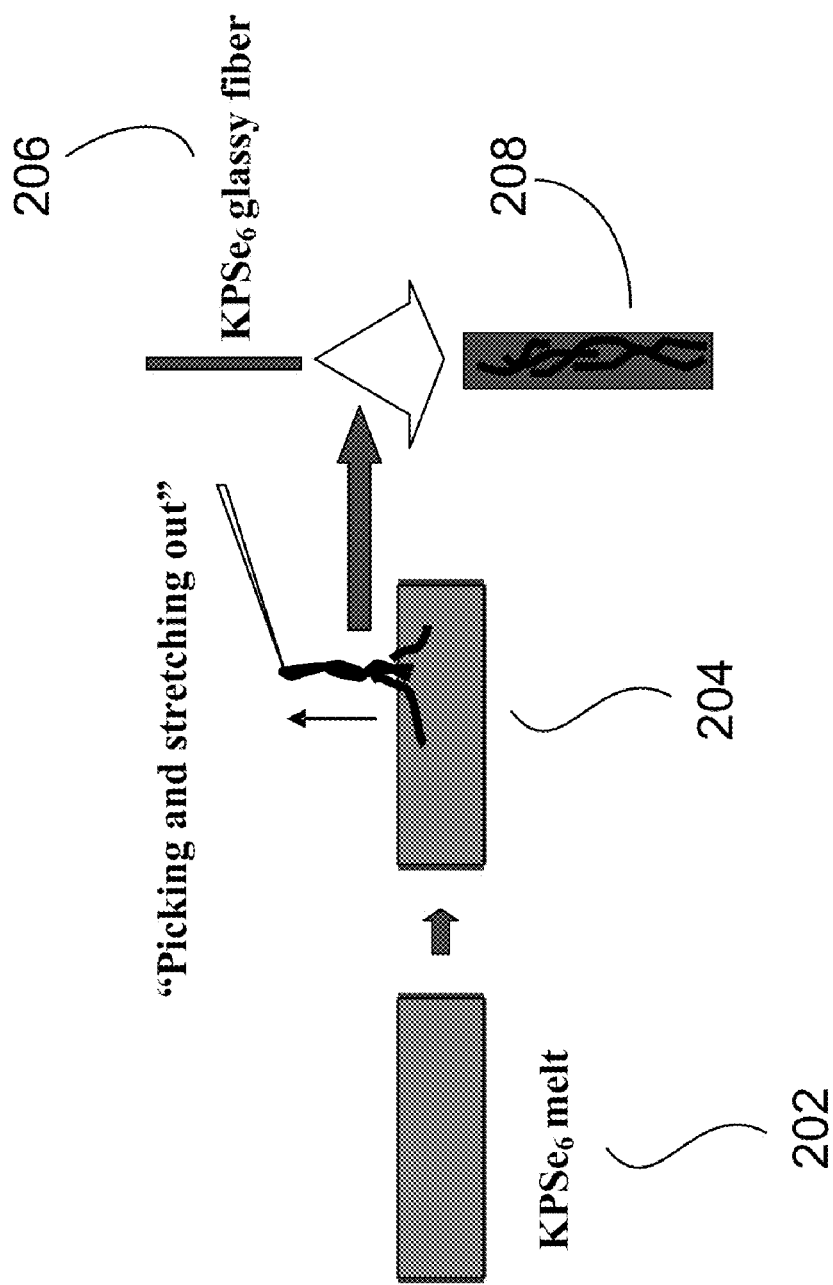
FIG. 2 illustrates a process of preparation of KPSe$_6$ glassy optical fiber from its melt according to one embodiment of the present invention.
Figure 3:
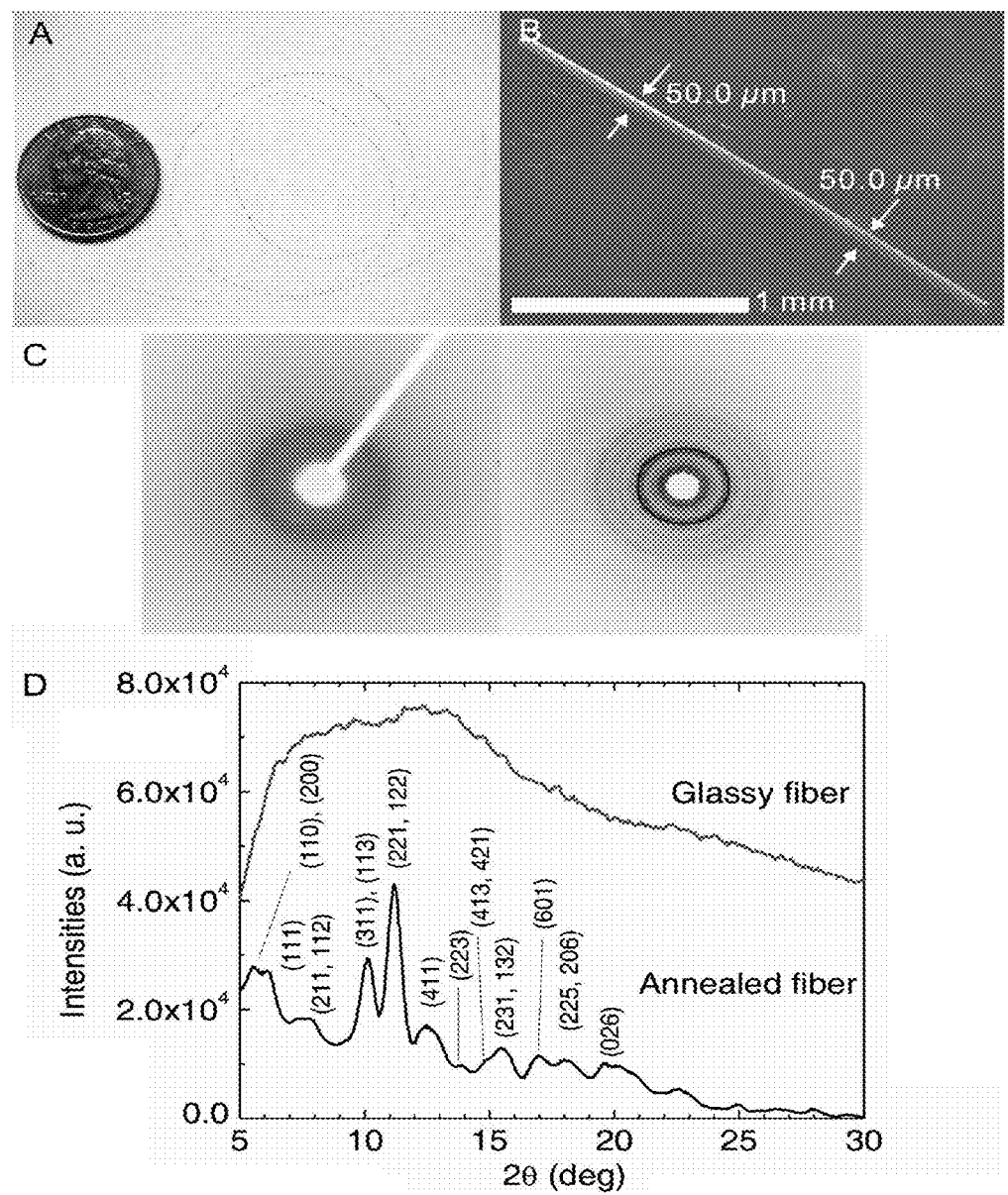
FIG. 3 shows (A) a representative photograph of a KPSe$_6$ optical fiber showing remarkable flexibility, which is made according to one embodiment of the present invention; (B) A representative SEM image of a KPSe$_6$ fiber showing thickness uniformity at 50.0 μm and surface smoothness; (C) X-ray diffraction ring patterns of pristine glassy (left) and annealed fiber (right) confirming their amorphous and crystalline nature, collected by STOE II single crystal diffractometer (Ag Kα); and (D) X-ray diffraction patterns of the pristine glassy (upper) and annealed fibers regenerated from the ring patterns. Note that the Bragg peaks from the annealed fiber are successfully indexed, indicative of the restoration of crystal structure on the fiber. (hkl) index on the major peak is presented.
Figure 4:
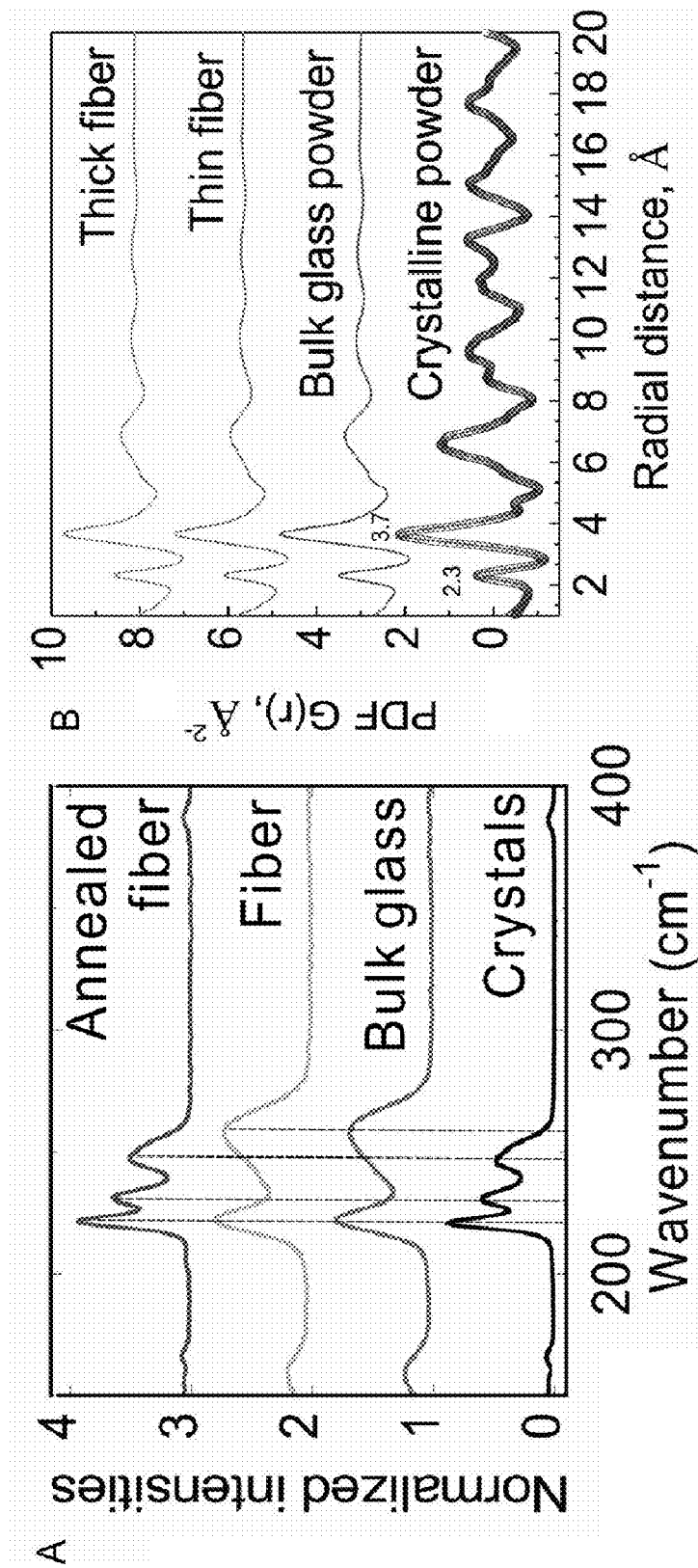
FIG. 4 illustrates (A) a Raman spectra of KPSe$_6$ crystal, bulk glass, pristine glassy fiber, and annealed fiber. (B) Pair distribution function (PDF) analysis for the glassy fiber, bulk glass, and crystalline powders. Fibers with different thickness at d~50 μm and d~200 μm were examined for comparison. Theoretical fit based upon single crystal structure refinement is plotted as black circles. The first peak at 2.3 Å corresponds to interatomic correlations of P—Se and Se—Se bonds, and the second peak at 3.7 ÅK . . . Se and second neighbouring Se . . . Se. Note that PDFs of bulk glass and glassy fibers are very close to that of crystalline powder, indicating local structural order are significantly preserved in the amorphous state of bulk powder and fiber, but only lost long-range crystallographic order. This observation plausibly supports the presence of the intrinsic second-order nonlinear optic properties on the bulk glass and glassy fiber.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

DEFINITIONS

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, "plurality" means two or more.

As used herein, the terms "comprising," "including," "carrying," "having," "containing," "involving," and the like are to be understood to be open-ended, i.e., to mean including but not limited to.

Overview of the Invention

The present invention, in one aspect, relates to a general fabrication method for second harmonic generating (SHG) optical glassy fiber using noncentrosymmetric crystal-glass phase-change materials. Alkali metal selenophosphate ternary compounds $APSe_6$ (A=K, Rb) and $A_2P_2Se_6$ (A=K, Rb, Cs) outperformed any known phase-matchable nonlinear optical materials with band gap 1.0 eV in second harmonic generation (SHG) susceptibility $d_{eff}$ and exhibited excellent mid-IR transparency. From the melt of the corresponding materials and temperatures between the melting and vitrification points, a high quality optical glassy fiber can be easily drawn out in multi meter in length and a few to hundred microns in thickness. These fibers have good flexibility which is remarkable for chalcogenide fibers. The optical glassy fibers exhibited strong waveguided second harmonic generation response along the fiber in the IR region. The nonlinear optical response was there without the application of electric fields (poling) to the fibers. The $d_{eff}$ value is comparable to that of commercially used crystals $KNbO_3$ and $KTiOPO_4$ (KTP). It also generated a frequency mixing signal of difference frequency generation (DFG) continuously in a wide range of visible/near IR region. These materials are soluble in polar organic solvent of hydrazine to give a thin glassy film by a simple spic coating. The resulting thin films are NLO-active. Annealing thin glassy films gave high performing crystalline films that exhibit strong NLO responses and ferroelectricity. These materials are of interest for broad applications as a frequency converters and waveguiding fibers. By adding excess chalcogens to $APSe_6$ compounds, new series of NLO glasses are prepared. They are also fiber and thin film processable.

In one aspect of the present invention, the approach to fabricate NLO glassy fibers is to use crystal-glass phase-change materials that adopt noncentrosymmetric space groups. Crystal-glass phase-change materials made of chalcophosphate and chalcogenide materials easily form glassy phases and restore its crystal structure. Recent studies by the inventors demonstrated that the glassy state still retains a substantial local structure but only loses long-range crystallographic order. In this case, the noncentrosymmetric arrangement in the crystal can be preserved to a large degree in the glassy form. Although the NLO susceptibility of glass would be smaller than that of the corresponding crystal, it must be superior to that of conventional glass that needs to be treated by a specific poling technique. It is observed that when the glassy fibers are only mildly poled with laser, they exhibit dramatically enhanced SHG performance. This approach can be generally applied for other noncentrosymmetric crystal-glass phase-change materials such as $Cs_5P_5Se_{12}$, $KMP_2Se_6$ (M=Sb, Bi) and $K_{1-x}Rb_xSb_{5-y}Bi_yS_8Se_{8-y}$. All these compounds have been synthesized. In one embodiment, it was dissolved crystal-glass phase-change material that adopt noncentrosymmetric space groups in polar organic solvents, and glassy thin film was prepared by a spin coating. Resulting glassy films can be easily transformed to crystalline films. Both crystalline and glassy thin films showed strong NLO response. They are also ferroelectric. Similar phenomena were also observed when we added additional chalcogens to noncentrosymmetric chalcogenide compounds. According to various embodiments of the present invention, one can prepare new glasses in bulk powders, solid ingots, monoliths, optical glassy fiber, and glassy thin films; and they exhibited significant NLO responses.

The crystalline $APSe_6$ (A=K, Rb) and $A_2P_2Se_6$ (A=K, Rb, Cs) materials, made according to various embodiments of the present invention, outperformed any known phase-matchable nonlinear optic materials with band gap above 1.0 eV in second harmonic generation susceptibility. The corresponding glassy phases (as mentioned above) also exhibited significant SHG response without poling, of which SHG susceptibility is comparable to that of commercial $KTiOPO_4$ (KTP) and $KNbO_3$. Both the crystalline and glassy phases have a wide transparency range from 0.6~0.7 λm to 19~20 μm, dependent upon band gaps. $K_2P_2Se_6$ showed isotropic thermal expansion, which is a key issue for crystal growing. Those compounds are easily processable to fibers or thin films that are favored for practical applications.

Various unique features of the present invention will be made as to the embodiments of the present invention in conjunction with the accompanying drawings in FIGS. 1-19.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Experimental Methods

Unless otherwise specified, the following experimental methods were used in the examples below.

X-ray Powder Diffraction. Analyses were performed using a calibrated CPS 120 INEL X-ray powder diffractometer (Cu $K_\alpha$ radiation) operating at 40 kV/20 mA and equipped with a position-sensitive detector with flat sample geometry.

Electron Microscopy. Semiquantitative analyses of the compounds were performed with a JEOL JSM-35C scanning electron microscope (SEM) equipped with a Tracor Northern energy dispersive spectroscopy (EDS) detector.

Solid-State UV-Vis spectroscopy. Optical diffuse reflectance measurements were performed at room temperature using a Shimadzu UV-3101 PC double-beam, double-monochromator spectrophotometer operating in the 200-2500 nm region.

Raman Spectroscopy. Raman spectra were recorded on a Holoprobe Raman spectrograph equipped with a CCD camera detector using 633 nm radiation from a HeNe laser for excitation and a resolution of 4 cm$^{-1}$. Laser power at the sample was estimated to be about 5 mW, and the focused laser beam diameter was ca. 10 μm. A total of 128 scans was sufficient to obtain good quality spectra.

Infrared Spectroscopy. FT-IR spectra were recorded as solids in a CsI or KBr matrix. The samples were ground with dry CsI or KBr into a fine powder and pressed into translucent pellets. The spectra were recorded in the far-IR region (600-100 cm$^{-1}$, 4 cm$^{-1}$ resolution) and mid-IR region (500-4000 cm$^{-1}$, 4 cm$^{-1}$ resolution) with the use of a Nicolet 740 FT-IR spectrometer equipped with a TGS/PE detector and silicon beam splitter.

Differential Thermal Analysis (DTA) Experiments were performed on Shimadzu DTA-50 thermal analyzer. A sample (~30 mg) of ground crystalline material was sealed in a silica ampoule under vacuum. A similar ampoule of equal mass filled with $Al_2O_3$ was sealed and placed on the reference side of the detector. The sample was heated to 600° C. at 10° C./min, and after 1 min it was cooled at a rate of −10° C./min to 50° C. The residues of the DTA experiments were examined by X-ray powder diffraction. Reproducibility of the results was confirmed by running multiple heating/cooling cycles. The melting and crystallization points were measured at a minimum of endothermic peak and a maximum of exothermic peak.

Nonlinear Optical Property Measurements. The frequency-tripled output (355 nm) of a passive-active mode-locked Nd:YAG laser with a pulse width of about 30 ps and a repetition rate of 10 Hz to pump an optical parametric amplifier (OPA) were used. The OPA generates vertically polarized pulses in the range 400~3,156 nm. In order to study the waveguided SHG response from the glass fiber made according to one embodiment of the present invention, the idler beam ($\lambda_{idler}$=1,240-1,610 nm) from the same OPA setting as above was used. The incident laser pulse of 0.2 mJ was focused onto the proximal surface of a fiber with a spot 300 μm in diameter using a 3 cm focal-length parabolic lens. The diameter of this fiber was about 122±2 μm and its length is 10 mm. The corresponding instantaneous peak power is about 6.7 MW. Considering the low pulse repetition rate of 10 Hz, however, the time-average input fluence is only 2.8 W cm$^{-2}$ well below the damage threshold for chalcogenide compounds. Although the corresponding peak fluence is about 9 GW cm$^{-2}$ that can induce third harmonic response of the test material, no third-harmonic generation was detected, even with an extended collection time. The negligible $\chi^{(3)}$ response from $APSe_6$ was independently confirmed through the absence of a Z-scan response. By selectively focusing the imaging lens on the opposite distal end of the fiber, the SHG signals were collected in a waveguide mode and dispersed with a Spex Spec-One 500 M spectrometer coupled to a nitrogen-cooled CCD camera. Since the monitoring range in the wavelength is rather wide, no filter was used but it was made sure that other optical components did not generate additional SHG signals. The SHG response from powder samples was measured using a reflection geometry under similar conditions.

Atomic Pair Distribution Function Analysis. Crystalline and glassy fine powder (<40 λm) and glassy fibers (d~50 and 200 μm) of $KPSe_6$ were measured. Diffraction data were collected at room temperature using the rapid acquisition pair distribution function technique. Data were collected using an MAR345 image plate detector and ~60 keV energy X-rays ($\lambda$=0.2128 Å) at the 11-ID-B beam line at the Advanced Photon Source. Measurements were repeated 4-5 times per sample to improve counting statistics. The data were combined and integrated using the program FIT2D. Various corrections were made to the data, such as subtraction of background, Compton and fluorescence scattering, geometric corrections, absorption, and so on, as described in reference. Corrections were made using the program PDFgetX2. Structural model was fit to the data using the program PDFFIT.

Example 1

This example illustrates composition(s) of matters or compounds that were used in various embodiments of the present invention.

Crystalline and glassy phases of
$A_{1-x}A'_xPSe_6S_{6-y}$ (A, A'=K, Rb, Tl, Ag, Cu; $0 \leq x<1$; $0 \leq y<6$) and $A_{2-x}A'_xP_2Se_6S_{6-y}$ (A, A'=K, Rb, Cs, Tl, Ag, Cu; $0 \leq x<1$; $0 \leq y<6$);

and glassy phases of
$A_{1-x}A'_xSe_z$ (A, A'=K, Rb, Cs, Tl, Ag, Cu; $0 \leq x<1$; $6<z<12$). $KPSe_6$, $K_2P_2Se_6$, and $KPSe_z$ ($6<z<12$)

are representative species for each series and are used for structural description for clarity. The compounds are structurally unique one-dimensional chalcophosphate compounds. $KPSe_6$ possesses $PSe_4$ tetrahedra condensed with polyselenide linkages to give the polymeric  chain. Thus, two P atoms are connected with $Se_o$ units in the chain, as shown in FIG. 1A. The length of Se chain can be extended up to $Se_{10}$ by adding excess Se to $KPSe_6$, and the glassy $KPSe_z$ ($6<z<12$) are obtained, as shown in FIG. 1B. $K_2P_2Se_6$ has infinitely extended helical chains of $$\tfrac{1}{\infty}[P_2Se_6^{2-}]$$

that is composed of ethane-like [$P_2Se_6$] units linked via terminal Se—Se linkages, as shown in FIG. 1C. $APSe_6$ and $A_2P_2Se_6$ are only examples of free-standing polymeric chalcophosphate with no coordinating metals.

Example 2

This example describes methods of making compounds, pure crystal and glass, that were used in various embodiments of the present invention.

For all compounds of
$APSe_6$, $A_2P_2Se_6$, and $APSe_z$ ($6<z<12$), substituting appropriate amount of other alkali metals, Tl, Ag, or Cu for A, or S for Se, enables to give isostructural solid solution phases of the compounds.

$APSe_6$: Pure $APSe_6$ (A=K, Rb) was made by a stoichiometric mixture of $A_2Se:P_2Se_5:Se$=1:1:6 under vacuum in a silica tube at 350° C. for 2 days. Energy dispersive spectroscopy analysis of the crystals showed an average composition of "$KPSe_{6.2}$" and "$Rb_{1.2}PSe_{6.1}$", respectively, for the orange rods-typed single crystals. Glassy phase of $APSe_6$ was prepared from a stoichiometric mixture of $A_2Se:P_2Se_5:Se$=1:1:6 under vacuum in a quartz tube at 8-900° C. for 1-2 minutes and subsequent quenching to room temperature.

$A_2P_2Se_6$: Pure $K_2P_2Se_6$ and $Rb_2P_2Se_6$ were made in quantitative yield by heating a mixture of $K_2Se:P_2Se_5=1:1$ and $Rb_2Se:P:Se=1:2.4:5$ in an evacuated and sealed silica tube at 450° C. for 3 d followed by cooling at a rate of 5°/h to 250° C., respectively. After washing with N,N-dimethylformamide (DMF) and ether, pure red/orange thick plate-typed single crystals were obtained. Energy dispersive spectroscopy (EDS) analysis of the crystals showed an average composition of "$K_2P_{1.9}Se_{5.8}$" and "$Rb_2P_{1.9}Se_{5.9}$". The glassy phases of $K_2P_2Se_6$ and $Rb_2P_2Se_6$ were prepared from a mixture of $K_2Se:P_2Se_5=1:1$ and $Rb_2P_2Se_6$ crystals respectively, placed in a silica tube and melted at 800-900° C. for 1-2 min and subsequent quenching in ice water. The crystalline compounds were air-stable for at least a week and stable under polar solvents such as DMF, N-methylformamide, methyl and ethyl alcohol and $H_2O$.

$KPSe_z$ ($6<z<12$) glasses were obtained by a stoichiometric mixture of $K_2Se:P:Se=0.5:1:z$ ($6<z<12$) under vacuum in a quartz tube at 700° C. for 1-2 minutes and subsequent quenching to room temperature. Dark red solid ingots were obtained.

All compounds were highly soluble in anhydrous hydrazine solution to give concentrated dark reddish solution.

Example 3

This example describes a process of making glass fiber from crystal-glass phase material according to one embodiment of the present invention.

In one embodiment, generally, the process includes the steps of providing a molten crystal-glass phase material in a container, wherein the temperature of the molten crystal-glass phase material is at or above the melting temperature of the molten crystal-glass phase material, $T_m$, to allow the molten crystal-glass phase material is in liquid phase; cooling the molten crystal-glass phase material such that the temperature of the molten crystal-glass phase material, $T_1$, is reduced to below $T_m$ such that the molten crystal-glass phase material is changed from the liquid phase to a viscous melt; and pulling a glass fiber of the crystal-glass phase material from the viscous melt, wherein $T_1$ satisfies the following relationship: $T_v<T_1<T_m$, and $T_v$ being the temperature at which the vitrification of the viscous melt of the crystal-glass phase material occurs, and wherein the crystal-glass phase material is characterized by having a reversible thermal behavior.

The reversible thermal behavior of crystal-glass phase-change materials is that upon heating the crystal-glass phase-change material crystallizes from glassy phase first and then subsequently melts into a viscous melt when the temperature is at or above the melting temperature of the crystal-glass phase-change material, but upon cooling only vitrification of the viscous melt occurs, rather than recrystallization of the crystal-glass phase-change material.

Referring now to FIG. 2A, a viscous melt of $APSe_6$ and $A_2P_2Se_6$, here for example $KPSe_6$, is prepared and contained in a container at a temperature at or above the melting temperature at step 202 in liquid phase. Then at step 204, the viscous melt is cooled from the liquid phase but the temperature is kept between vitrification and the melting point, here in the range of about 230-280° C., where a continuous viscosity-temperature dependence exists that makes pulling, even high-speed pulling, or drawing possible of fiber from the viscous melt. A glass fiber 206 is pulled from the viscous melt, which is then at Step 208 placed under vacuum in a quartz tube at 8-900° C. for about 1-2 minutes and subsequent quenching to room temperature. $APSe_z$ glassy fibers were also obtained in a similar way.

It is noted that the processing temperature of the chalcogenide fibers is considerably lower than that of oxides for the existing technologies. For example, silica fiber requires approximately 2,000 K for softening Fibers with thickness ranging from a few to a hundred micrometers, having remarkable flexibility, could be prepared 'by hand' as shown in FIG. 2A, or by machine for high speed pulling as known in the art, with lengths approaching a meter. As seen in the scanning electron microscope (SEM) image of FIG. 2B, a representative $d=50.0$ μm fiber displays a high degree of thickness uniformity and surface smoothness, and the cross-section of a fiber is continuous with no bubbles or cracks. An X-ray diffraction study of pristine fiber on a single crystal diffractometer showed only diffuse scattering, confirming its dominant amorphous nature, whereas that of annealed fiber showed strong Bragg scattering revealing crystallinity, as shown in FIG. 2C and FIG. 2D, respectively.

The Raman spectrum of crystalline $KPSe_6$ at room temperature shows major shifts at 220 (s), 231 (m), and 246 (m) $cm^{-1}$, as shown in FIG. 4A. The shift at 220 $cm^{-1}$ is unambiguously assigned to the $PSe_4$ stretching mode by comparing with the $A_g$ stretching mode of the $T_d$ symmetry of $[PSe_4]^{3-}$ ligand. The shifts at 231 and 246 $cm^{-1}$ can be assigned to antisymmetric and symmetric Se—Se stretching modes of the diselenide group, respectively. The Raman spectra of $KPSe_6$ bulk glassy powder and glassy fiber are identical, showing the broader and weaker peaks at 220 (bm) and 259 (bm) $cm^{-1}$, whereas the overall peak pattern is similar to that of the crystal. This suggests that the $[PSe_4]$ building blocks and Se—Se bonds are still intact and local structural motifs are largely preserved in the bulk glass and glassy fiber but the long-range crystallographic order is lost. The PDF analysis of $KPSe_6$ crystalline, bulk glass, and glassy fiber is also in agreement with the Raman spectroscopic data, as shown in FIG. 4B. The PDF of bulk glass and glassy fiber shows well-defined correlations up to ~8 Å with the maxima at 2.3 Å (P—Se and Se—Se bonds) and 3.7 Å (K . . . Se and the second neighbour Se . . . Se distances) being very close to those of the crystalline phase. Above ~8 Å, the PDFs decay rapidly to zero, indicating the loss of the long-range order. The PDF result is consistent with that of $K_2P_2Se_6$. Those observations support the facile restoration of the crystal structure from the amorphous state at the reversible crystal-glass phase transition. The Raman spectrum of annealed fiber is same as that of bulk crystal, confirming the recovery of crystalline structure in the fiber form, consistent with the X-ray powder diffraction results (See FIGS. 3C and 3D). However, it is found that the annealed fiber consists of grain boundaries with macroscopic sizes, implying a polycrystalline structure in the extended dimension.

The chalcophosphate anions are capable of condensing via Q-Q bonds (Q=S, Se), whereas the oxo-phosphates are not known to do so. Therefore, the chalcogenide analogues have the potential produce large family of compounds. It was observed remarkably large second order nonlinear optical response from both crystalline and glassy $APSe_6$ and $A_2P_2Se_6$ compounds; and local structural motifs are largely preserved in bulk glass and glassy fiber but the long range order is lost. According to this observation, if one adds excessive chalcogen to noncentrosymmetric crystalline compounds, one could have new glass compounds that possess local structural units of the mother compounds and exhibit physicochemical properties related with noncentrosymmetric materials such as second order nonlinear optical response and ferroelectricity.

In this regard, it was prepared "KPSe$_7$", "KPSe$_8$", and "KPSe$_9$" by adding one, two, and three molar excess amount of Se to reaction mixture for KPSe$_6$. It was remarkable to observe that Raman spectra and PDFs of "KPSe$_7$", "KPSe$_8$", and "KPSe$_9$" showed local structural motifs of [PSe4] tetrahedral and Se—Se bonds are still intact in the glasses, and quenched glasses represented well defined correlations up to 14 Å.

Example 4

This example describes a process of making thin film from crystal-glass phase material according to one embodiment of the present invention.

In one embodiment, generally, the process includes the steps of mixing at least one of crystal-glass phase materials and the compounds in anhydrous hydrazine to form a solution; applying the solution to a substrate to form a film of the solution over a surface of the substrate; and annealing the film of the solution over a surface of the substrate at a first temperature sufficiently high to remove the hydrazine to allow a film of the at least one of crystal-glass phase materials to be formed in glass phase, wherein the crystal-glass phase material is characterized by having a reversible thermal behavior.

After the glass film is made, further annealing the glassy film at a second temperature about twice higher than said first temperature would allow the glassy film to crystallize into a crystallized film. In one embodiment, the second temperature during said further annealing ranges from about 250° C. to 300° C. The time of said further annealing ranges from about 2 to 15 minutes. The crystallized film of the crystal-glass phase material made by the process exhibits intrinsic second-order nonlinear optic properties.

Figure 5:
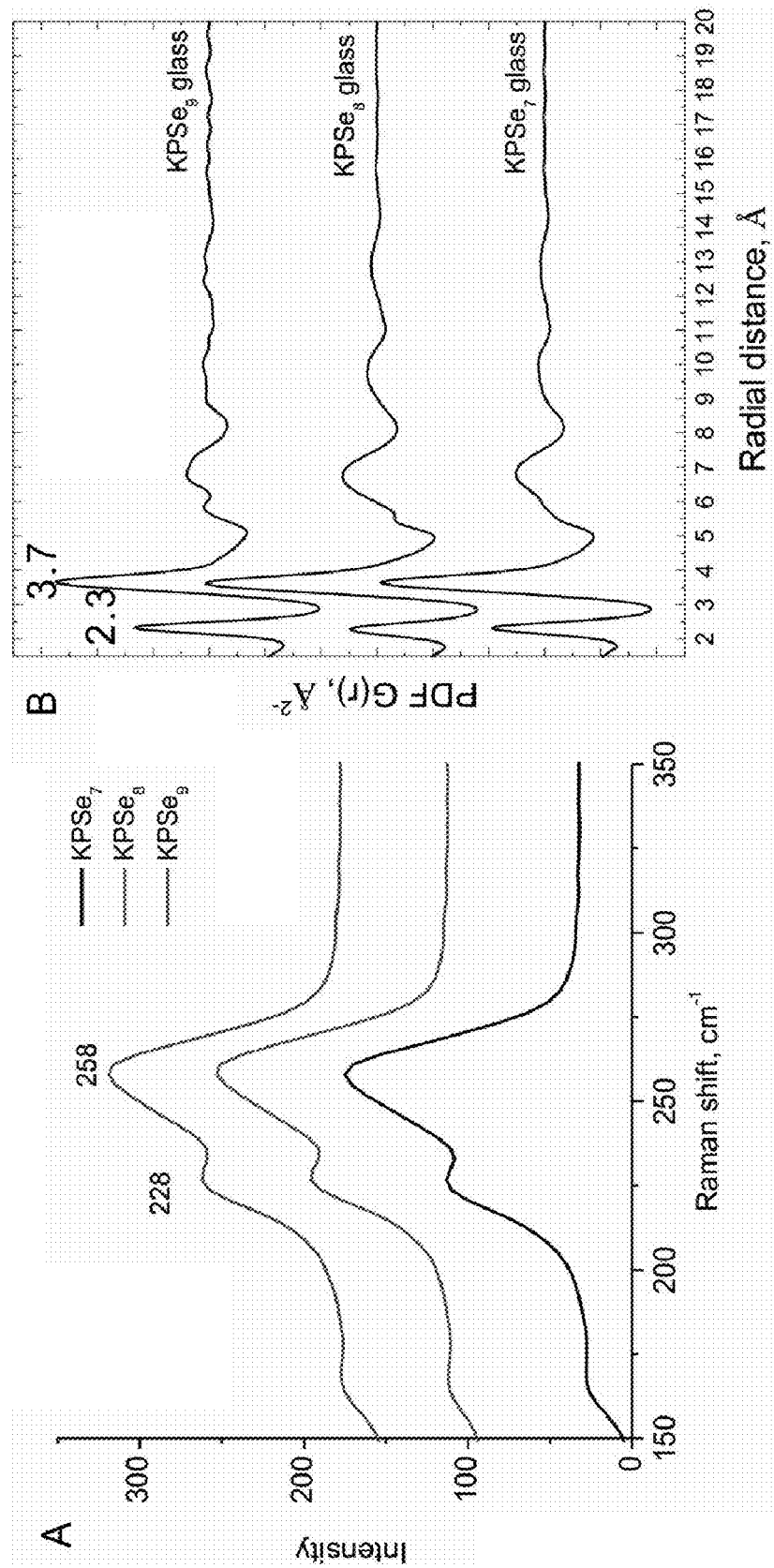
FIG. 5 illustrates a Raman spectra and pair distribution function analysis for the glass powder of "KPSe$_7$", "KPSe$_8$", and "KPSe$_9$".
Figure 6A:
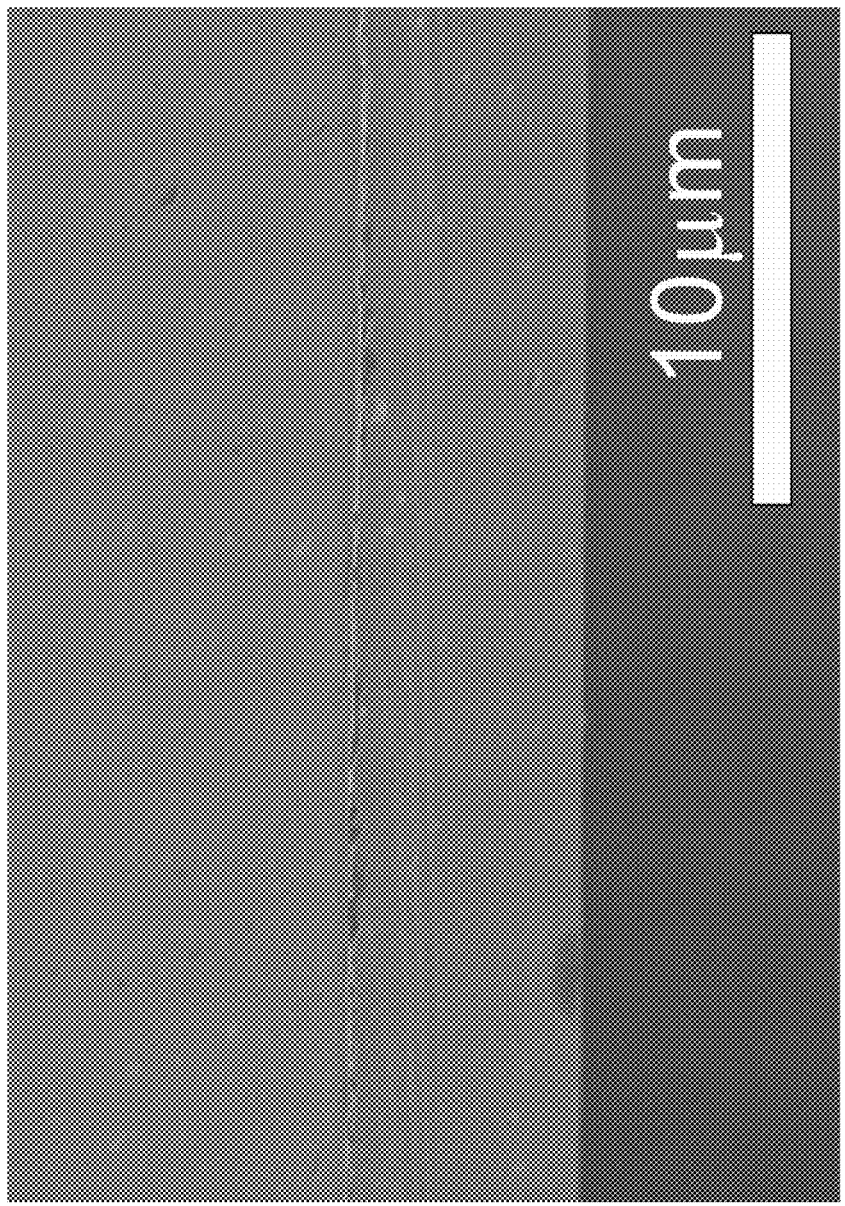
FIG. 6A illustrates a representative SEM image of RbPSe6 glassy thin film showing clean surface morphology of spin-coated thin film.
Figure 6B:
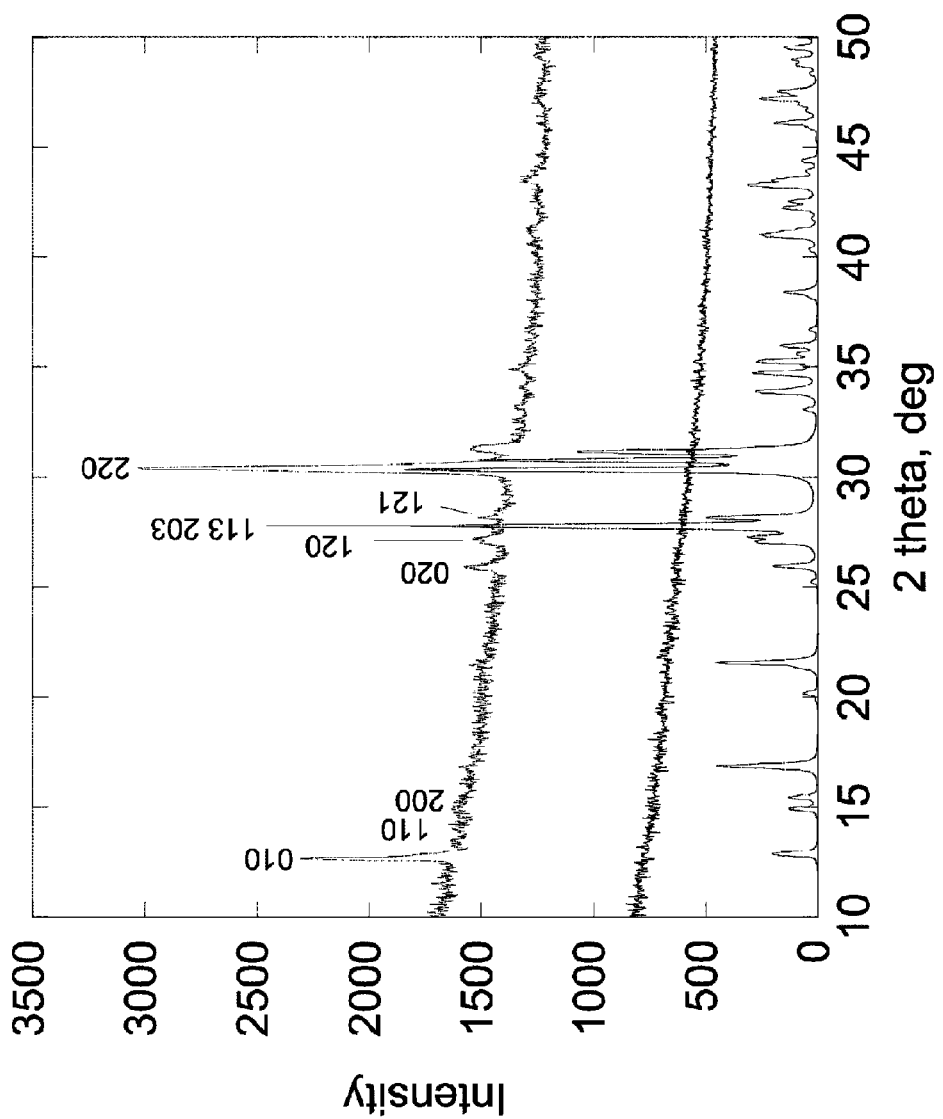
FIG. 6B illustrates X-ray diffraction patterns of the pristine RbPSe6 glass film on a Si wafer substrate (middle) and the crystallized film after annealing at 250° C. for 5 min, compared with theoretical simulation patterns based on RbPSe$_6$ single crystal diffraction refinement. Major peaks are indexed.

In one exemplary embodiment, APSe$_6$, A$_2$P$_2$Se$_6$, and APSe$_z$ (6<z<12) are dissolved in anhydrous hydrazine forming concentrated solutions. These solutions can be readily spin-coated or drop-casted into films of various thicknesses on a substrate. The films are then annealed at 100-130° C. to remove the hydrazine to give orange to red glassy films depending on thickness. A representative glassy thin film having the clean surface and well defined edge is shown in FIG. 5. Crystalline APSe$_6$ and A$_2$P$_2$Se$_6$ films are obtained by further annealing the corresponding glassy films for about 5-10 min at about 250-300° C. FIG. 6 shows the thin film X-ray diffraction patterns of the pristine and crystallized RbPSe$_6$ film, confirming amorphous nature of a glassy film and fully recovered crystalline structure after annealing at 250° C. for about 5 min.

Example 5

This example describes nonlinear optical properties of crystalline and glassy phases of APSe$_6$ and A$_2$P$_2$Se$_6$, and APSe$_z$ (6<z<12) glasses according to one embodiment of the present invention and use of them.

Figure 7:
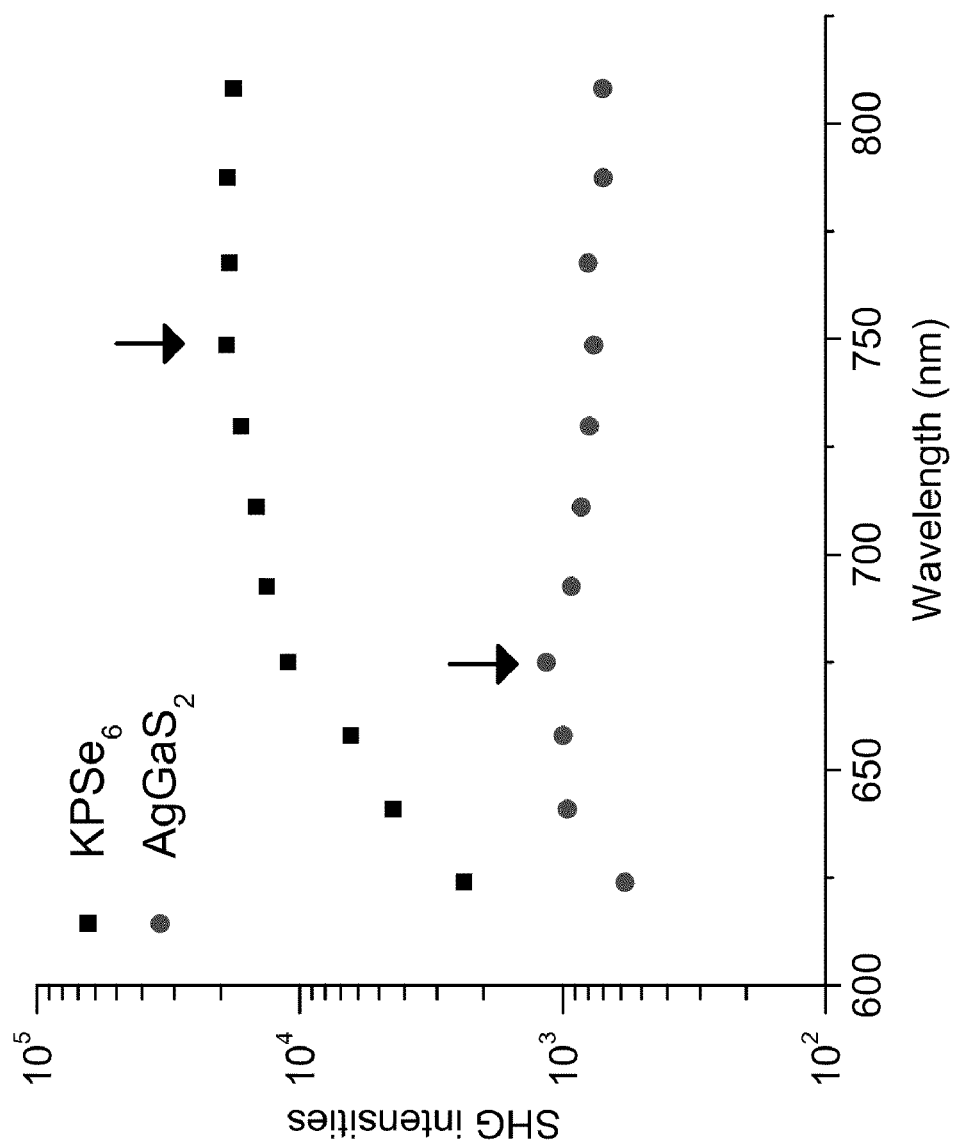
FIG. 7 illustrates relative size to SHG intensities of KPSe6 crystal (squares) and AgGaSe2 (circles).
Figure 8:
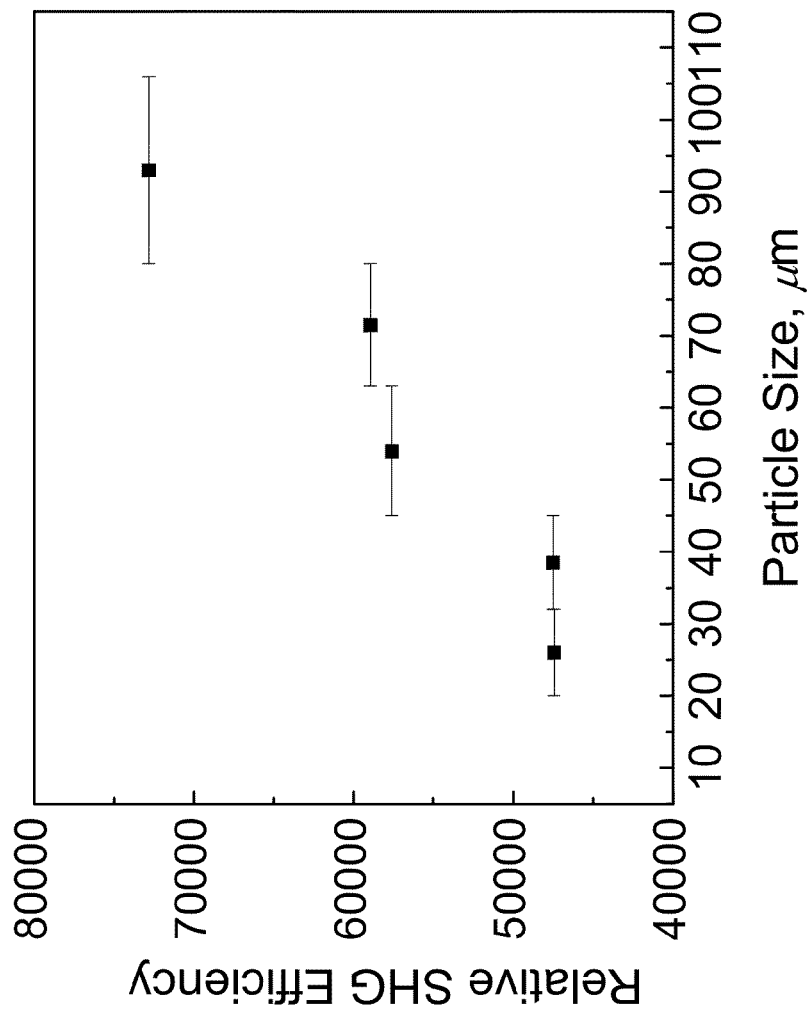
FIG. 8 illustrates particle size to SHG intensities diagram of crystalline RbPSe$_6$ showing type-I phase-matching.
Figure 9:
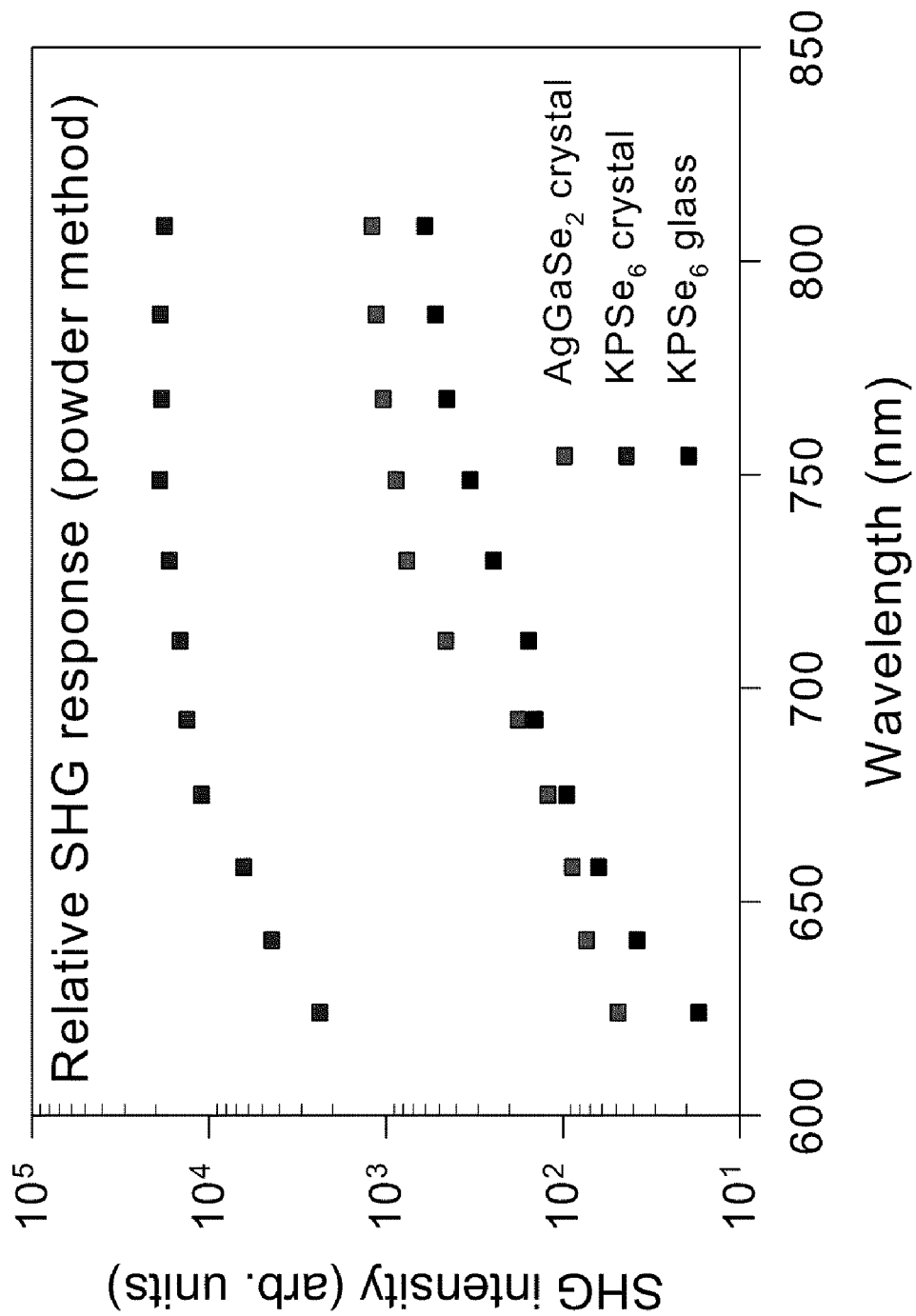
FIG. 9 illustrates SHG response of KPSe$_6$ crystal and powdered glass relative to AgGaSe$_2$ crystal over a wide range of wavelengths.
Figure 10:
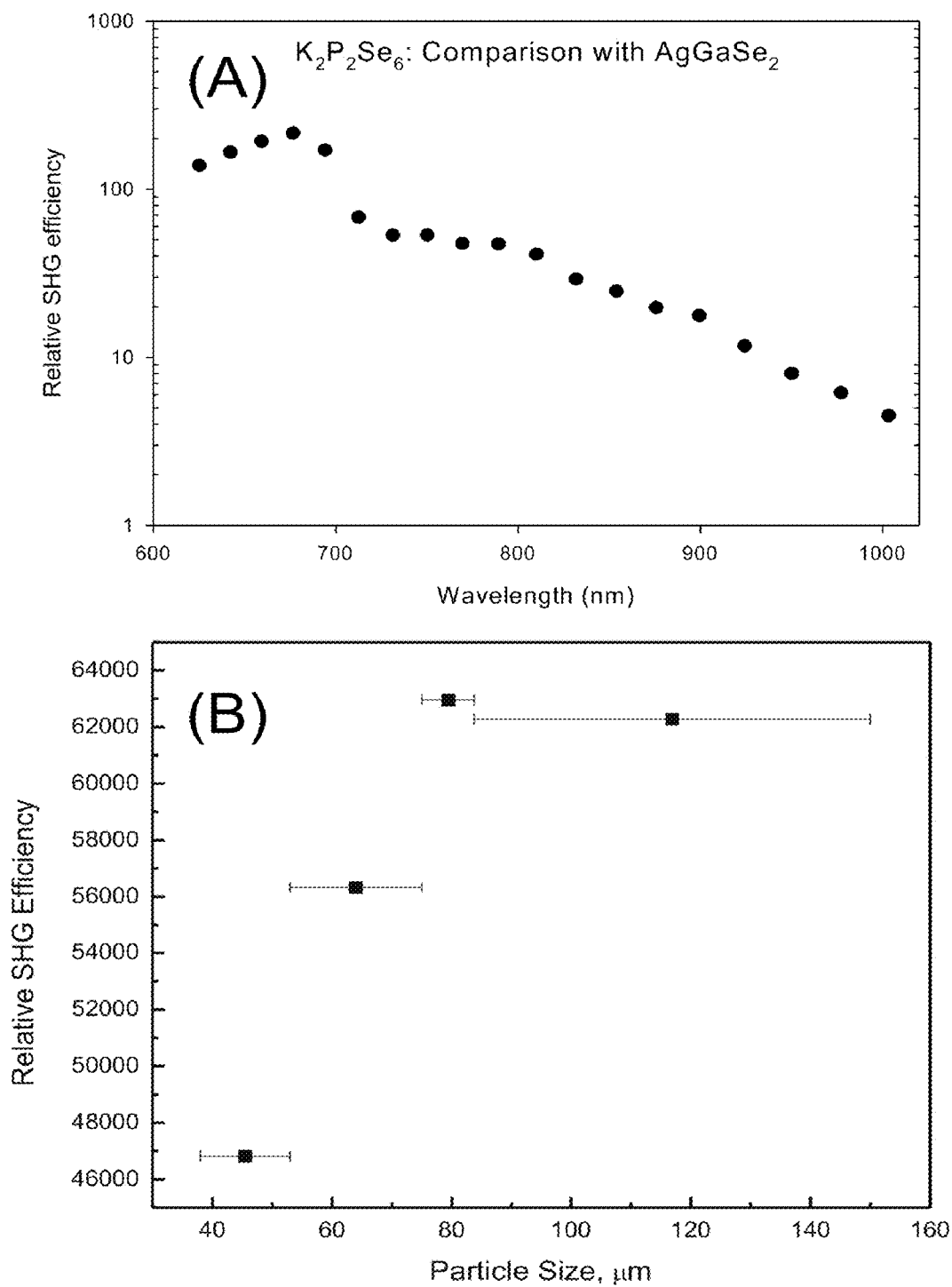
FIG. 10 illustrates (A) SHG response of K$_2$P$_2$Se$_6$ relative to AgGaSe$_2$ over a wide range of wavelengths. (B) Particle size to SHG intensities diagram of crystalline K$_2$P$_2$Se$_6$ showing type-I phase-matching.

In one exemplary embodiment, SHG responses of crystalline and bulk glassy powders of APSe$_6$ (A=K, Rb) compounds with various fundamental wavelengths λ ranging from 1,240 to 1,610 nm were examined using a modified Kurtz powder method. Input light pulses were generated by an optical parametric amplifier driven by a Nd:YAG pulsed laser at 355 nm with a repetition rate of 10 Hz. Crystalline APSe$_6$ (A=K, Rb) powder generated very strong second harmonic signals over a wide range in the visible/near infrared region, as shown in FIG. 7. The responses increase with particle size, indicating type-I phase-matching in the observation range, as shown in FIG. 8. AgGaS$_2$ powder prepared in a similar fashion was used as a reference since it is also phase matchable in the wavelength range of interest, with the well-established value of $\chi_{ref}^{(2)}$=36 pm V$^{-1}$. In order to estimate the absolute value of $\chi^{(2)}$, the SHG intensities of crystalline KPSe$_6$ were directly compared with those of AgGaS$_2$ for the same particle size (137.5±12.5 µm), as shown in FIG. 7. Note the SHG intensities must be compared in the plateau region, indicated by arrows in FIG. 7, where multiphoton absorption is minimal. The absolute $\chi^{(2)}$ was calculated using $\chi^{(2)}=\chi_{ref}^{(2)}(I^{2\omega}/I^{2\omega}_{ref})^{1/2}$=146.4±5.2 pm V$^{-1}$ for the phase-matchable case, where $I^{2\omega}$ and $I^{2\omega}_{ref}$ are the measured SHG intensities from the sample and the reference, respectively. The experimental $\chi^{(2)}$ is reasonably consistent with the theoretical estimate based on electronic structure calculations at the density functional theory level, which yield $\chi^{(2)}$=151.3 pm V$^{-1}$ and 149.4 pm V$^{-1}$ for K$^+$ and Rb$^+$ salts. These values for APSe$_6$ compounds are the highest among phase-matchable inorganic NLO materials with band gaps over 1.0 eV. Note that the narrower optical band gap causes the poorer laser damage threshold while shrinking the range of optical transparency window. Unlike crystalline APSe$_6$ (A=K, Rb), the particle-size dependence indicates that glassy KPSe$_6$ is not phase matchable, as expected for a nominally isotropic material. Therefore, direct comparison of glassy KPSe$_6$ with crystalline AgGaSe$_2$ is made, which is also not phase matchable in the observation range, as shown in FIG. 9. Considering a large $\chi^{(2)}$=66 pm V$^{-1}$ for crystalline AgGaSe$_2$, it is surprising that the glass of KPSe$_6$ exhibited SHG intensities comparable to crystalline AgGaSe$_2$. However, estimation of $\chi^{(2)}$ using the same powder technique for non-phase matchable materials requires the coherence length $l_c$, which is not generally accessible for chalcogenide compounds with typical $l_c$ much smaller than the minimum powder size of 20 µm that we can prepare. The lower-bound $\chi^{(2)}$ value for glassy KPSe$_6$ was estimated to be about 7 pm V$^{-1}$ using $l_c$=3 µm for AgGaSe$_2$ at λ=1.6 µm.

Crystalline K$_2$P$_2$Se$_6$ generated strong double frequency (i.e. SHG) signals from the fundamental idler beam. The SHG intensity of K$_2$P$_2$Se$_6$ showed a maximum at 789 nm which is about 50 times larger than that of AgGaSe$_2$ in the same wavelength. Under the same experimental conditions AgGaSe$_2$ showed a SHG maximum at 890 nm and in this wavelength the corresponding response of K$_2$P$_2$Se$_6$ was 20-fold higher, as shown in FIG. 10A. A$_2$P$_2$Se$_6$ (A=K, Rb) is also type I phase-matchable, as shown in FIG. 10B.

Figure 11:
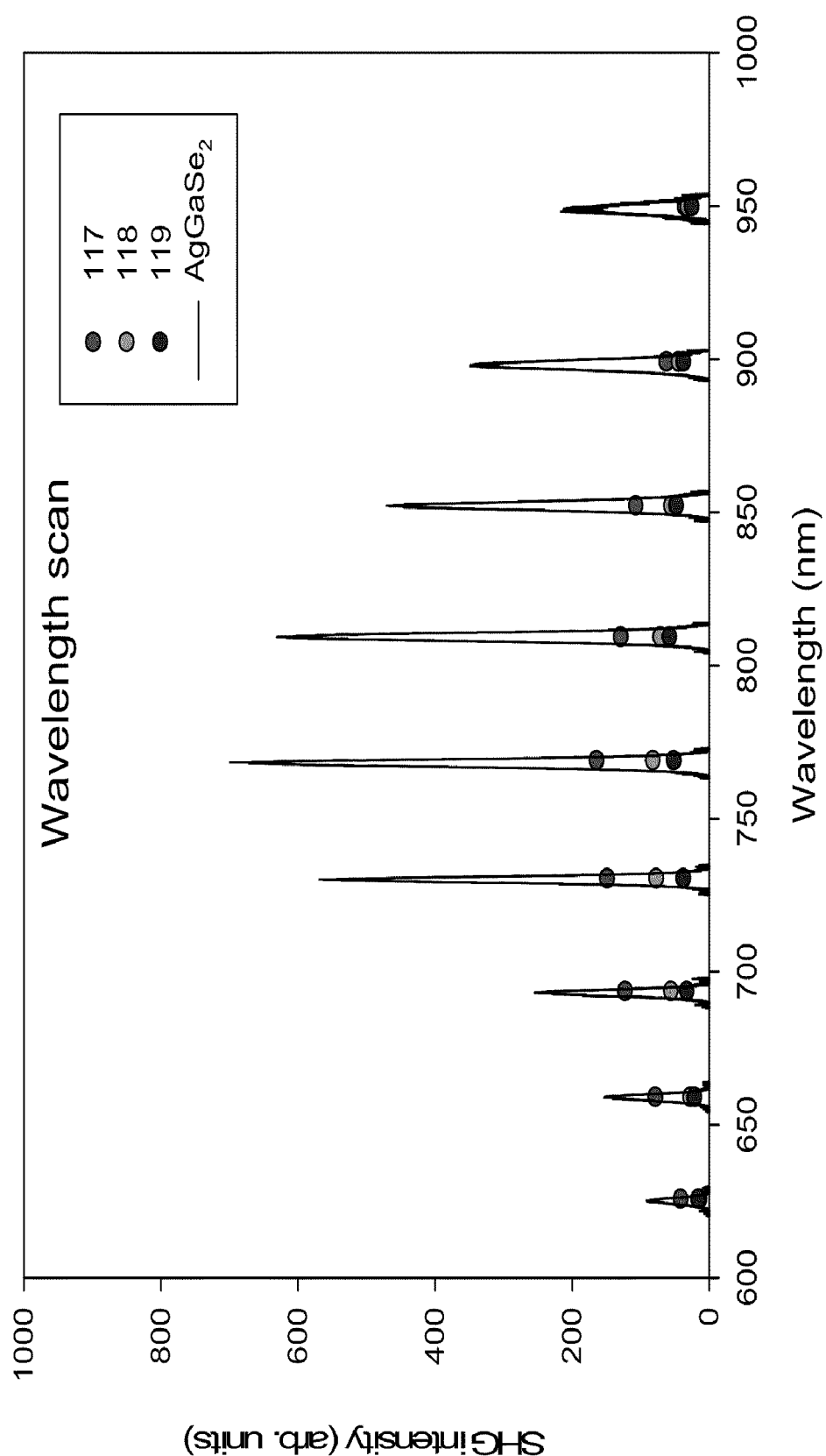
FIG. 11 illustrates SHG response of "KPSe$_7$", "KPSe$_8$", and "KPSe$_9$" glassy powder relative to AgGaSe$_2$ powder over a wide range of wavelengths.

KPSe$_z$ (6<z<12) glassy compound series exhibited significant innate SHG response like APSe$_6$ and A$_2$P$_2$Se$_6$ glasses, as shown in FIG. 11. APSe$_6$ and A$_2$P$_2$Se$_6$ are crystal-glass phase-change materials and their crystalline phases crystallize in the noncentrosymmetric space group, and their glassy phases are observed to possess largely preserved local structural motifs. In this regard, large SHG response of glasses could be understood. However, "KPSe$_7$", "KPSe$_8$", and "KPSe$_9$" are totally different class of materials from APSe$_6$ and A$_2$P$_2$Se$_6$ glass family in that APSe$_z$ does not have noncentrosymmetric crystalline counterparts. Only 1-3 excess mole of Se was added to the same reaction mixture of KPSe$_6$. It is contemplated that excess Se could be polymerized with [PSe4] tetrahedral units and Se in the melt of "KPSe$_6$" to form noncentrosymmetric arrangement of chalcophosphate anions. If true, this discovery can be widely applied to prepare second order NLO glassy materials. For example, by adding more chalcogens to noncentrosymmetric chalcogenide compounds, various new NLO glasses could be obtained.

Figure 12:
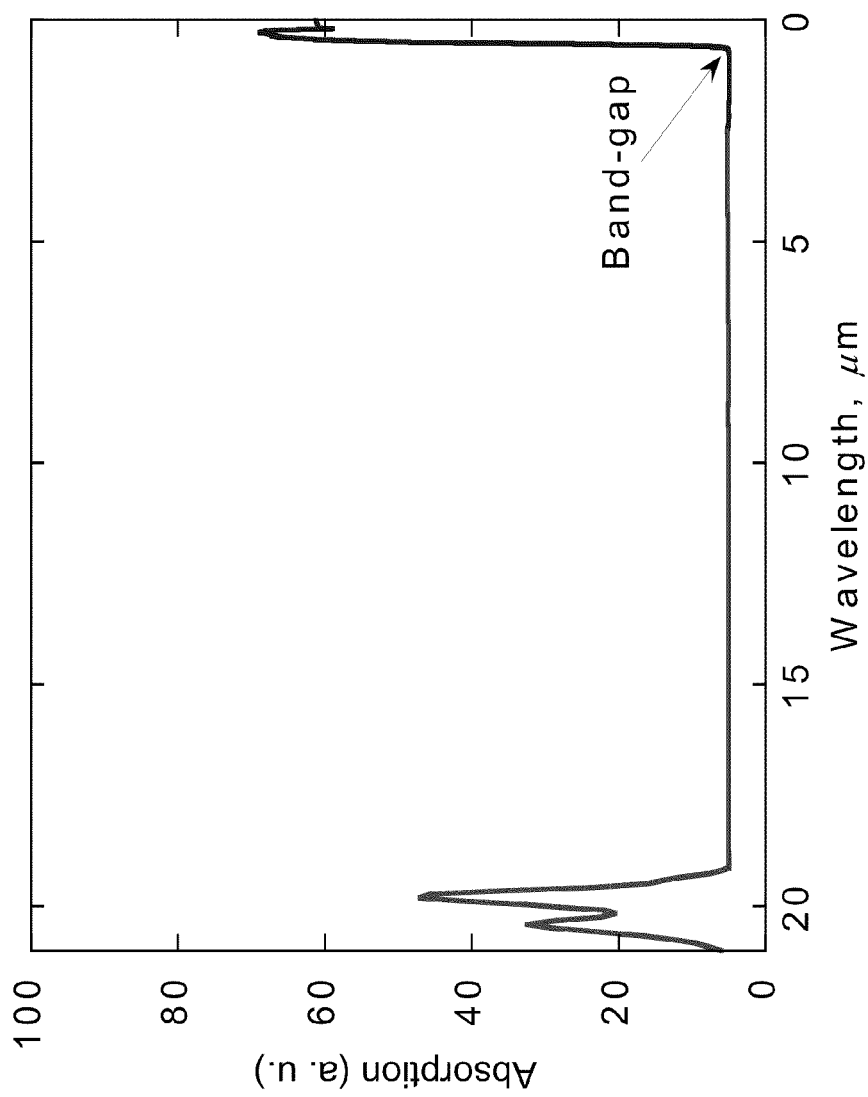
FIG. 12 illustrates Far-IR (red line)/mid IR (green line)/vis (blue line) absorption spectra of crystalline K$_2$P$_2$Se$_6$. Wide transparent range of crystalline K$_2$P$_2$Se$_6$ above the absorption band at 19.8 μm at far-IR region through mid-IR to 0.596 μm at visible region is shown.

APSe$_6$ (A=K, Rb) and A$_2$P$_2$Se$_6$ demonstrated wide optical transparency ranging from long wave IR (LWIR) to near IR (NIR)/visible light, as shown in FIG. 12. For K$_2$P$_2$Se$_6$, The mid-IR transmittance spectrum showed little absorption from 505 cm$^{-1}$ (19.8 μm) to 4000 cm$^{-1}$ (2 μm). There is no light absorption below the band gap transition suggesting uninterrupted light transmission in the compound. The optical transparency extends over to its absorption edge of 2.08 eV (596 nm) in the visible region. Above 19.8 μm in the far-IR region, the compound exhibited a complex set of absorptions, consistent with its Raman and far-IR spectra. Optical transparency is a key feature for materials aimed at NLO applications. For example, the important NLO material for IR applications, $AgGaSe_2$, shows LWIR transmission up to 17 μm.

Example 6

This example describes nonlinear optical properties of glassy fiber according to one embodiment of the present invention and use of them.

Figure 13:
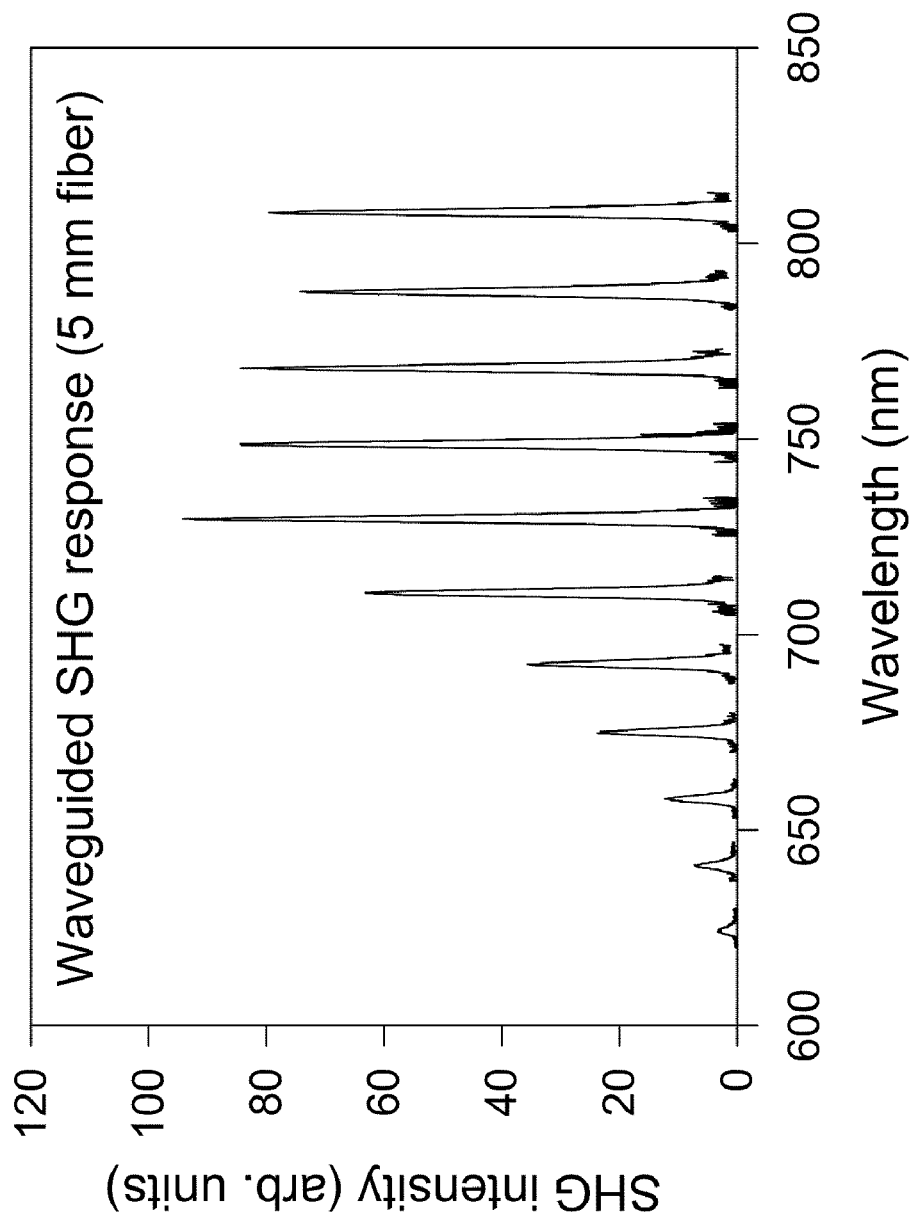
FIG. 13 illustrates SHG waveguidance mode response of KPSe$_6$ glassy fiber (D=122 μm, l=5 mm) as a function of fundamental
$\lambda_{idler}$=1240-1610 nm.

As described above, $APSe_6$ and $A_2P_2Se_6$ crystals and bulk glasses showed large SHG response and broad mid IR transmittivity range. Since the bulk glass powder showed significant SHG response, it was as well examined the corresponding generation and guiding of NLO light in glassy fibers. Being careful to precisely align the fiber with the laser path, it was focused the tuneable incident beam (λ=1,240-1,610 nm) onto the proximal end of the fiber (d=122 μm, l=10.0 mm); wave-guided outgoing light was collected from the distal end. As-prepared $APSe_6$ glassy fiber acted as a frequency convertor in a waveguide mode. It produced continuously tuneable SHG signal over a wide range of wavelengths (640-805 nm), as shown in FIG. 13. The decreased SHG signal below 700 nm is due to the two-photon-induced absorption beyond the band gap. The observation of intrinsic SHG response from $KPSe_6$ glassy fiber is consistent with that found in the corresponding bulk glass powder. Note the SHG signal is generated continuously along the path, but the full path represents a macroscopic distance of 10.0 mm. In the absence of any innate NLO fiber available at this time, the first observation of macroscopic generation and propagation of SHG light along glassy fibers, in addition to being novel, made possible by practicing the present invention, foreshadows practical applications. Regarding the materials themselves, further understanding of the temperature dependence, surface tension and viscosity of the melt, the use of high purity starting materials, and a more sophisticated mechanical drawing process, all promise much higher quality of the fibers is possible.

DFG experiments were also performed, a process that is especially important for generating mid-IR light and facilitates multichannel conversion. Here it was used both the signal and idler output beams of the optical parametric amplifier (OPA). The energy conservation among these two beams requires $1/\lambda_{signal} + 1/\lambda_{idler} = 1/355$ nm, and by the definition of DFG, $1/\lambda_{signal} - 1/\lambda_{idler} = 1/\lambda_{DFG}$. Thus, for a given $\lambda_{idler}$, the expected wavelength for DFG was, $$\lambda_{DFG} = \left(\frac{\lambda_{idler}}{\lambda_{idler} - 710\text{nm}}\right) 355\text{nm}. \quad (1)$$

Figure 14:
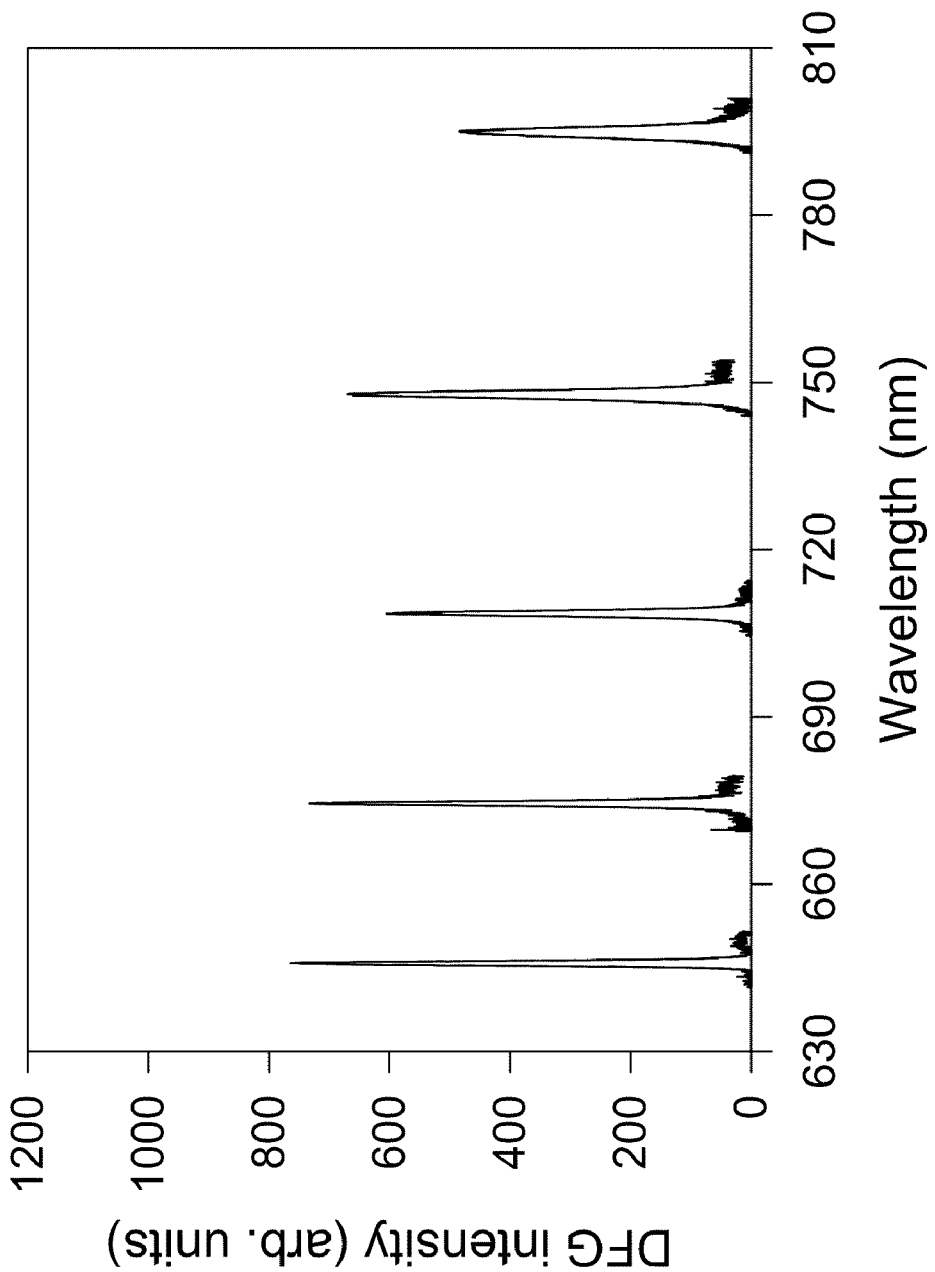
FIG. 14 illustrates DFG responses in a wide range of wavelengths generated by a KPSe$_6$ glassy fiber.

By introducing different combinations of idler and signal beams, the $KPSe_6$ glass fiber successfully generated continuously tuneable near-IR light by DFG, as shown in FIG. 14. Deviation among DFG intensities arose from the signal beam, which was beyond the band gap. Although the detection limit (<1 μm) prohibited observing DFG at mid-IR, $APSe_6$ (A=K, Rb) should also produce tuneable coherent light throughout mid-IR region because the compounds are optically transparent there, a region where few NLO materials are available. SFG was not studied here because the experimental set up produces constant $\lambda_{SFG}$ at 355 nm, light that is strongly absorbed through the over-the-gap excitation of the material.

Figure 15:
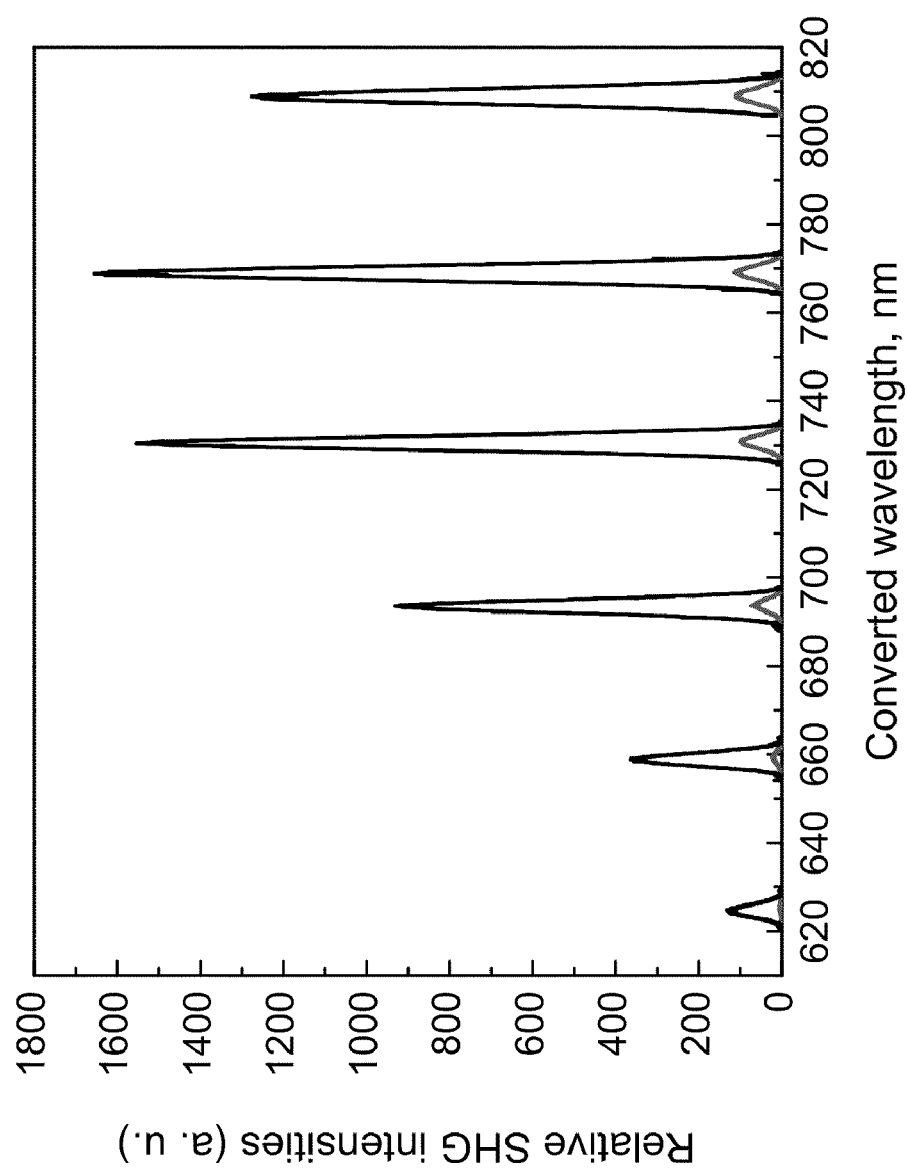
FIG. 15 illustrates the relative SHG intensities measured from 620 to 805 nm for the pristine glassy and annealed fibers, representing remarkable enhancement of the SHG response after heat treatment at 260° C. for 3 min.

Phase-change materials are of great interest as emerging technologies including rewritable optical media and the development of nonvolatile phase-change memory. Conversion between the crystalline and glassy states can be driven by applying a voltage or heat, or by irradiating with an appropriate laser. The stoichiometric compounds $APSe_6$ (A=K, Rb) can switch between the crystalline and glassy states without complications arising from compositional changes. It was exploited this property to switch the NLO properties of $APSe_6$ fibers. It was annealed $KPSe_6$ fibers at 260° C. for about 3 min and measured the waveguided SHG response. Remarkably, the annealed fiber exhibited over 10 times larger SHG intensities compared to the pristine glassy fiber in a wide range of wavelengths, as shown in FIG. 15. Note, however, that this enhancement is still a factor of 10 below the SHG intensity changes between the glassy and crystalline powders shown in FIGS. 7 and 8. This deficit most likely arises from partial cancellation from random distributions of macroscopic grain boundaries with various polarization directions. Other possible mechanism could be random phase matching (RPM) since SHG intensity arising from RPM increases linearly with the NLO medium size.

Finally, alkali chalcophosphates are compositionally very flexible. In the case of $K_2P_2Se_6$, for example, substituting appropriate amount of other alkali metals, Tl, Ag, or Cu for K, or S for Se, enable to tune the band gap, keeping the structure, crystal-glass phase-change behavior, and nonlinear optic property. Substitution of Tl, Ag, or Tl can enhance the air/moisture stability of the materials and meet the condition for specific application conditions.

Example 7

This example describes nonlinear optical properties of glassy and crystalline thin film according to one embodiment of the present invention and use of them.

Figure 16A:
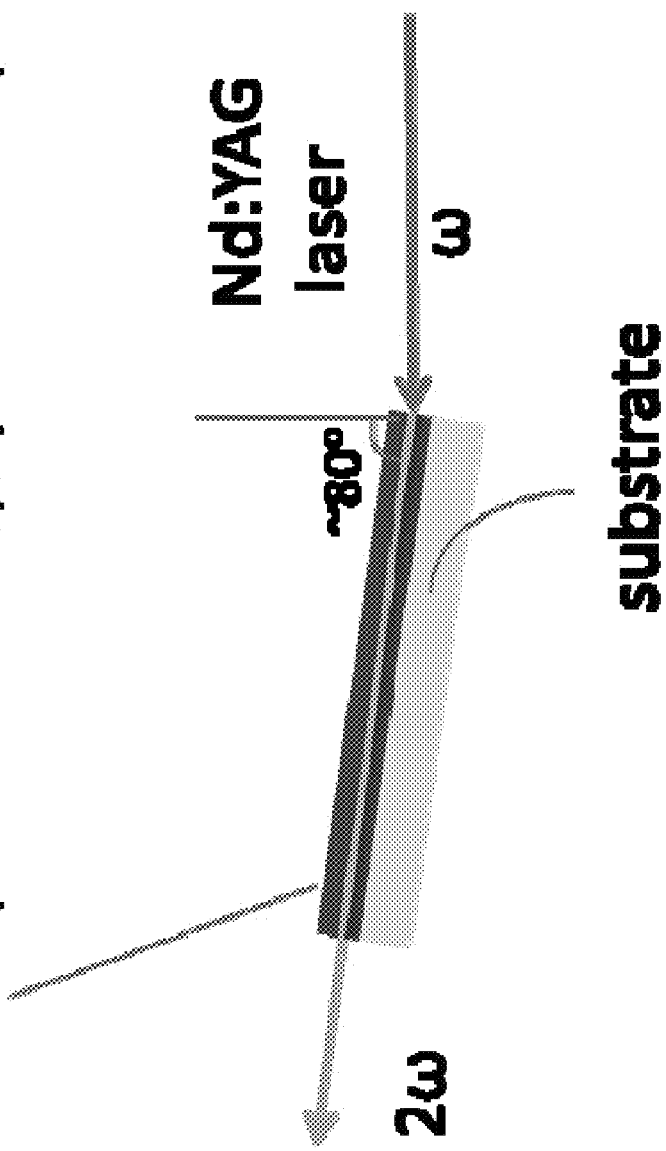
FIG. 16a illustrates waveguided NLO response measurement of RbPSe$_6$ thin film.
Figure 16B:
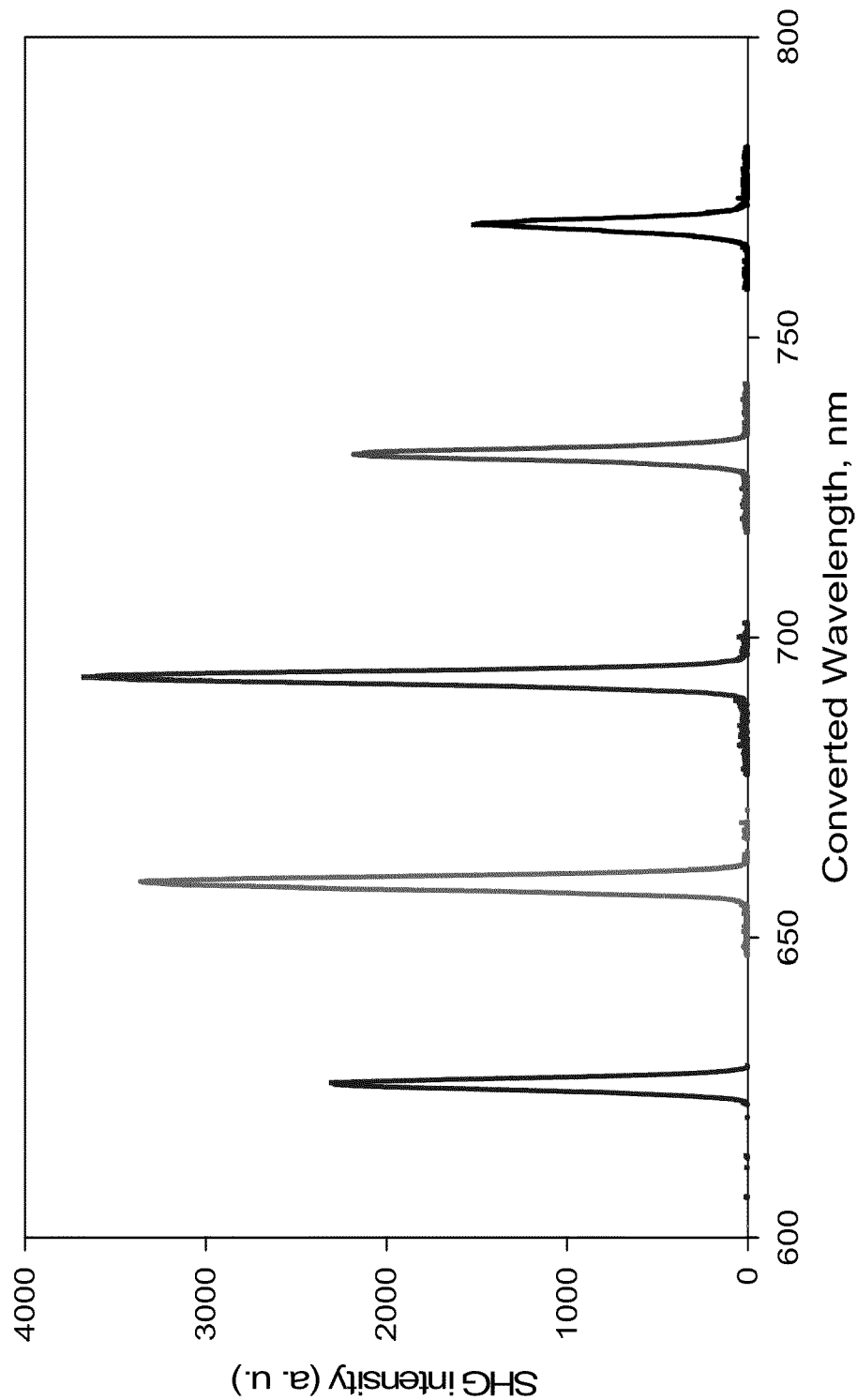
FIG. 16b illustrates the waveguided SHG response transmitted through 1.25 cm long RbPSe$_6$ thin film.
Figure 17:
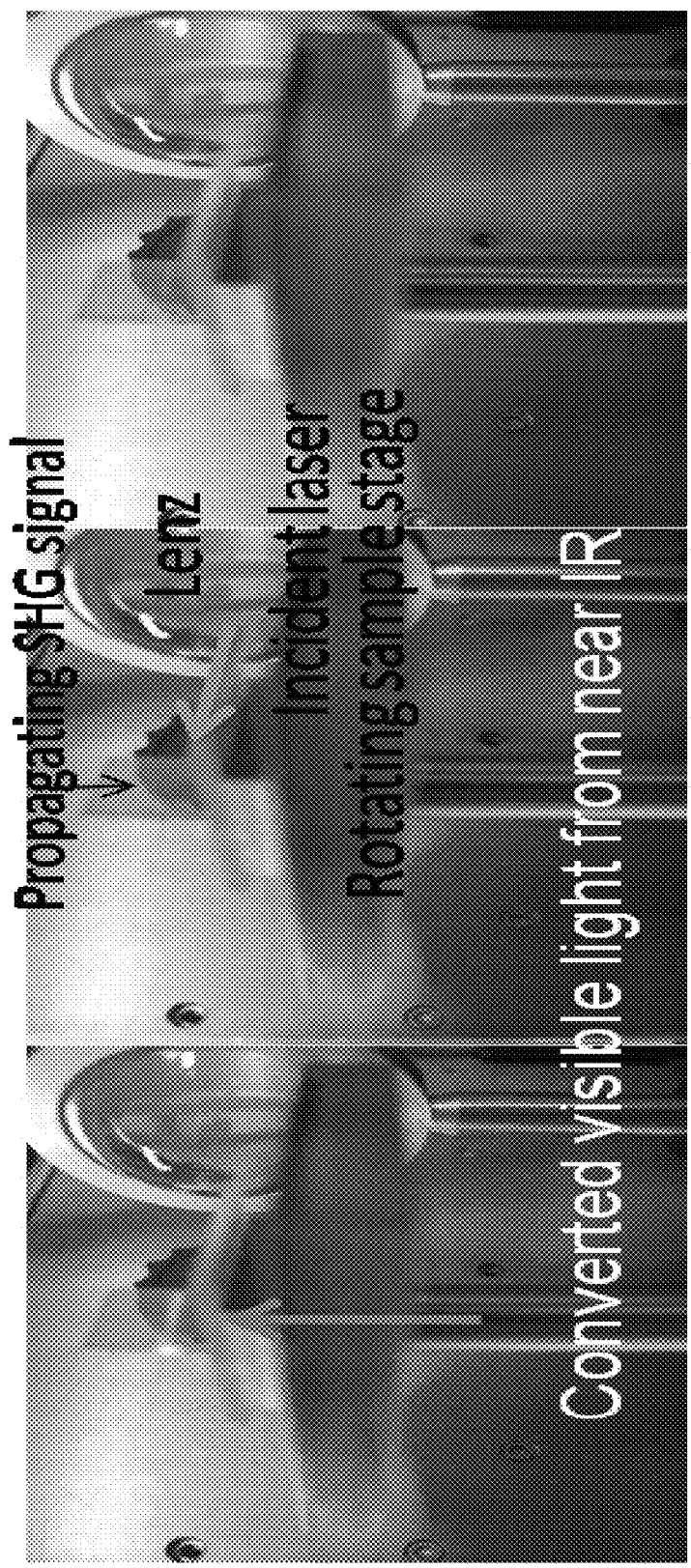
FIG. 17 shows images of visible green, red, and orange light converted from invisible near IR laser.

As described above, since the strong second order nonlinear optical properties for bulk glass powder and glassy fiber were observed, further efforts were made to fabricate glass and crystalline thin film of the compounds. Because all compounds showed similar behavior, $RbPSe_6$ is chosen as an exemplary example. It was tested spin-coated glassy thin film and crystalline thin film by annealing at 260° C. for 3 min. Glassy thin film showed significant SHG response at near IR region. The annealed film showed remarkably enhanced NLO properties. Being careful to precisely align the film with the laser path, in a set up as shown in FIG. 16A, the tuneable incident beam was focused onto proximal edge of the film, and ongoing light was collected from the distal end. RbPSe6 film acted as a frequency convertor in a waveguide mode. It produced continuously tuneable SHG signal over a wide range of wavelengths (625-768 nm), as shown in FIG. 16B. The deviation of SHG intensities result from the same reason as the crystalline, bulk glass and fiber samples as described above. FIG. 17 clearly showed strong waveguided SHG visible green, red and orange light converted from invisible near IR, confirming the continuous IR tuneability of RbPSe6 NLO thin film.

Figure 18:
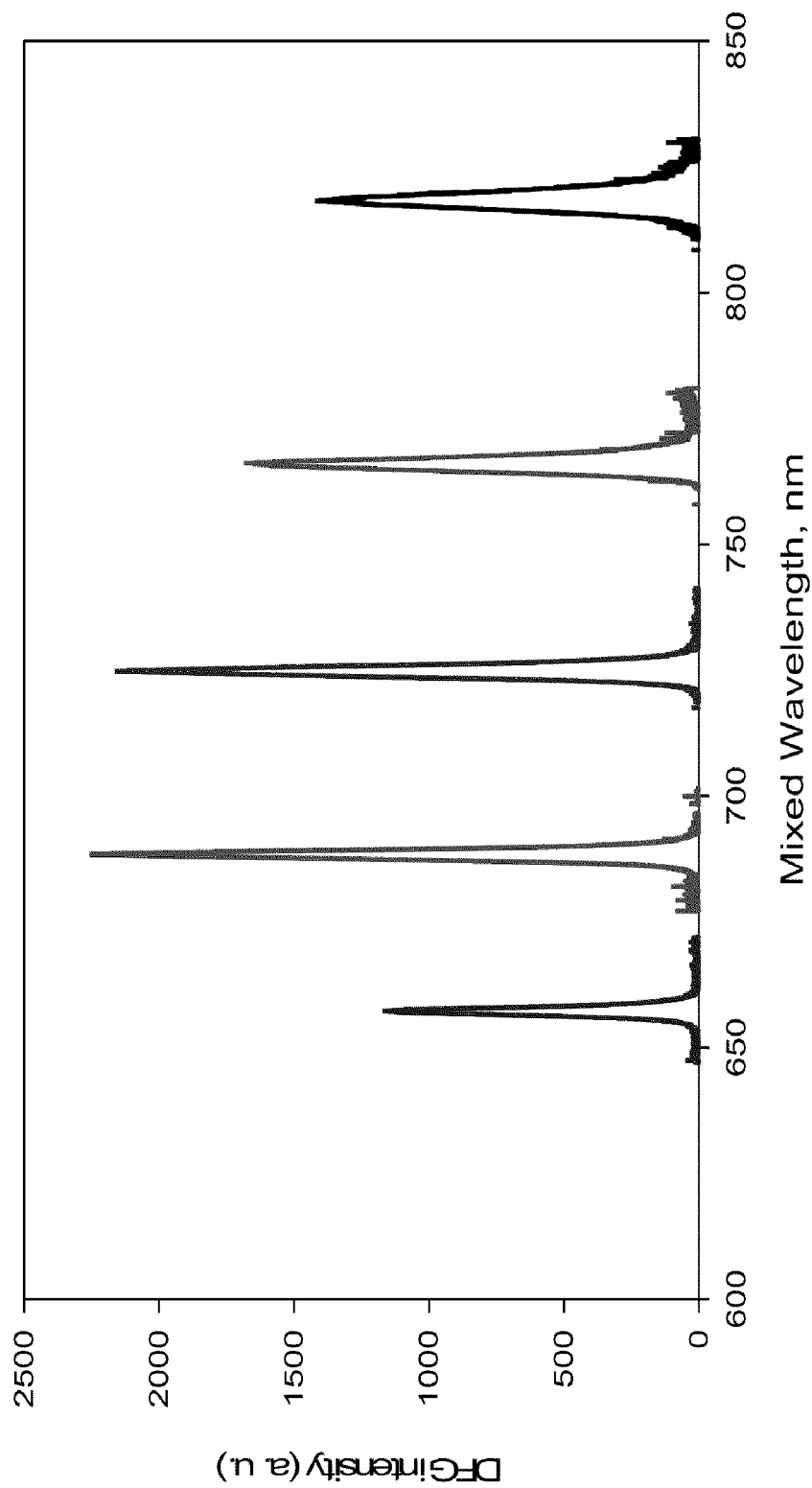
FIG. 18 illustrates the waveguided DFG response transmitted through 1.25 cm long RbPSe$_6$ thin film.

By introducing different combinations of idler and signal beams, the $RbPSe_6$ thin film successfully generated continuously tuneable near-IR light by DFG, as shown in FIG. 18.

Example 8

This example describes ferroelectric properties of glass fiber, glassy and crystalline thin film according to one embodiment of the present invention and use of them.

Figure 19:
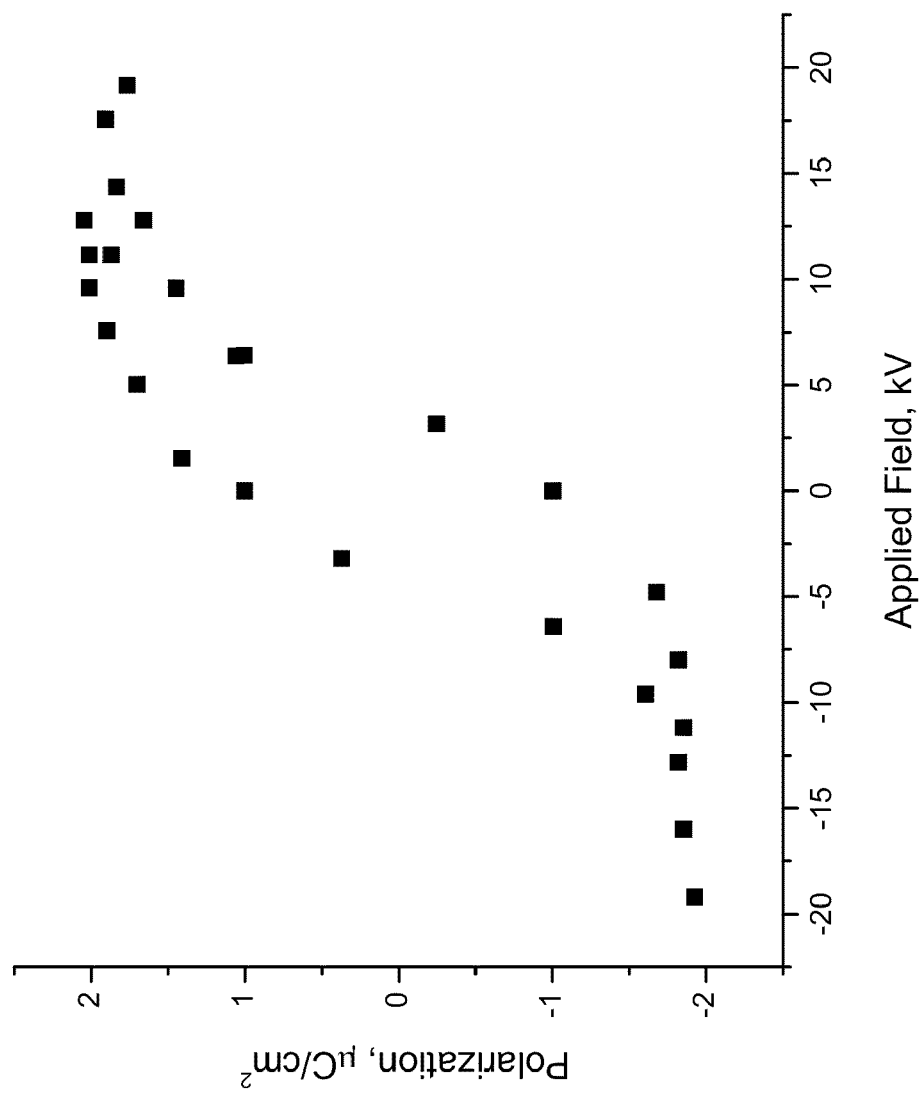
FIG. 19 illustrates ferroelectric hysteresis of RbPSe$_6$ crystalline thin film made according to one embodiment of the present invention.

Ferroelectricity is symmetry dependent property as is SHG. Noncentrosymmetric arrangement of the crystal structure is prerequisite. The title materials readily form glassy fibers and thin films; and they can be converted to crystalline form. In fact, thin film preparation of ferroelectric materials is one of the most challenging problem in this field. In one exemplary embodiment, it was used crystalline $RbPSe_6$ thin film that was converted from spin-coated amorphous film to measure ferroelectric behavior, the measured ferroelectric hysteresis of which is shown in FIG. 19.

Example 9

This example describes some applications of glass fiber, glassy and crystalline thin film according to various embodiments of the present invention.

Optical fibers exhibiting large second-order nonlinearity made according to various embodiments of the present invention can be used in frequency converter, wave mixer, optical switches, modulators, routers, splitters for wavelength-division-multiplexed (WDM) networks and optical microscopy and greatly improve their performance.

They can also be used in remote sensing, optical computing, molecular spectroscopy, atmospheric monitoring, ultra-sensitive detection, pollution monitoring, atmospheric chemistry, chemical and biological warfare detection (ppb levels), noninvasive medical diagnosis by breath analysis, and ultra-sensitive detection of explosives down to ppt levels using cavity ring-down spectroscopy.

Chalcogenide glasses have excellent optical transparency, mechanical flexibility, and high index of reflection, which makes them as promising candidates for photonic crystal fibers and planar waveguides.

Ferroelectricity, pyrroelectricity, and piezoelectricity applications of crystalline and glassy bulk compounds and thin films and glassy fibers are also possible.

Thus, in sum, among other things, the present invention provides two novel approaches on how to create stable NLO glass fibers and thin films. In one aspect, it was demonstrated that noncentrosymmetric phase-change materials can be used to quench an NLO-active glass phase from which fibers with stable SHG properties can be drawn. Glassy thin film can be conveniently converted by heat treatment at low temperature to form high quality corresponding crystalline thin film. Namely, $APSe_6$ glass fibers in certain embodiments possess intrinsic, switchable second-order NLO properties with the strongest response known for glasses. The approach disclosed here is an example of combining apparently unrelated properties (NLO+phase-change behaviour) to create new functional materials. This finding opens up the possibility of creating active, all-optical, broadband networks that independently modulate frequency, with no additional NLO or electronic devices. It was further showed that glassy thin films of those materials can be conveniently spin-coated and they are second-order NLO active. Those materials are also ferroelectric.

In another aspect, it was disclosed that addition of excess chalcogens to noncentrosymmetric chalcogenide compounds can provide wide range of new NLO-active glasses. Those materials also could be ferro-, pyro-, and piezoelectric.

Other advantages of the present invention include:

1) a general preparation approach was invented in an inexpensive and convenient way to produce optical glassy fibers and thin films exhibiting strong intrinsic SHG and ferroelectricity using non-centrosymmetric chalcophosphate materials;
2) the fibers show good wave-mixing performance (difference harmonic generation) without the need for poling;
3) the fibers demonstrate function in waveguide mode in the visible and the near IR region;
4) the $APSe_6$ and $A_2P_2Se_6$ glassy fibers are remarkably flexible;
5) the glassy thin films are second order NLO active and ferroelectric;
6) the glassy film can be easily converted to high quality crystalline films by heat treatment; and
7) a general preparation approach was invented to make new NLO-active bulk glasses and glassy fibers by adding excess chalcogens to noncentrosymmetric chalcogenide materials.

The foregoing description of the exemplary embodiments of the invention has been presented only for the purposes of illustration and description and is not intended to be exhaustive or to limit the invention to the precise forms disclosed. Many modifications and variations are possible in light of the above teaching The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES (1) APSe(6) (A=K, Rb, and Cs): Polymeric selenophosphates with reversible phase-change properties Author(s): Chung I, Do J, Canlas C G, Weliky D P, Kanatzidis M G, Inorganic Chemistry 43 (9): 2762-2764 May 3 2004.

(2) Helical Polymer $1/\infty[P_2Se_6^{2-}]$: Strong Second Harmonic Generation Response and Phase-Change Properties of Its K and Rb Salts Chung, I.; Malliakas, C. D.; Jang, J. I.; Canlas, C. G.; Weliky, D. P.; Kanatzidis, M. G., J. Am. Chem. Soc.; (Article); 2007; 129(48); 14996-15006.

(3) Xu, W.; Blazkiewicz, P.; Fleming, S. *Adv. Mater.* 2001, 13, 1014.

(4) Corbari, C.; Kazansky, P. G.; Slattery, S. A.; Nikogosyan, D. N. *Appl. Phys. Lett.* 2005, 86, 071106.

(5) Nakayama, Y.; Pauzauskie, P. J.; Radenovic, A.; Onorato, R. M.; Saykally, R. J. Liphardt, J.; Yang, P. *Nature,* 2007, 447, 1098.

(6) Tong, L.; Gattass, R. R.; Ashcom, J. B.; He, S.; Lou, J.; Shen, M.; Maxwell, I.; Mazur, E. *Nature,* 2003, 426, 816.

(7) Choy, M. M.; Byer, R. L., *Physical Review B* 1976, 14, (4), 1693.

(8) Nikogosyan, D. N., *Nonlinear optical crystals: a complete survey.* Springer-Science: New York, 2005;

(9) Knight, J. C. *Nature,* 2003, 424, 847.

What is claimed is:

1. A glassy or crystal compound made from one or more noncentrosymmetric crystal-glass phase-change materials comprising one or more chalcogenide compounds having a structure of $A_{1-x}A'_xPSe_6S_{6-y}$ (A, A'=K, Rb, Tl, Ag, Cu; $0 \leq x <1; 0 \leq y<6$), $A_{2-x}A'_xP_2Se_6S_{6-y}$ (A, A'=K, Rb, Cs, Tl, Ag, Cu; $0 \leq x <1; 0 \leq y \leq 6$), or $A_{1-x}A'_xPSe_z$ (A, A'=K, Rb, Cs, Tl, Ag, Cu; $0 \leq x \leq 1; 6 <z<12$).

2. The glassy or crystal compound of claim 1, wherein the chalcogenide compounds comprise one or more compounds having a structure of $A_{1-x}A'_xPSe_6S_{6-y}$ (A, A'=K, Rb, Tl, Ag, Cu; $0 \leq x<1; 0 \leq y<6$), $A_{2-x}A'_xP_2Se_6S_{6-y}$ (A, A'=K, Rb, Cs, Tl, Ag, Cu; $0 \leq x<1; 0 \leq y <6$), or $A_1A'_xPSe_z$ (A, A'=K, Rb, Cs, Tl, Ag, Cu; $0 \leq x<1; 6 <z<12$).

3. The glassy or crystal compound of claim 1, wherein the chalcogenide compounds comprise at least a part of a polymeric $^1\infty[PSe_6^-]$chain, an extended helical chain of $^1\infty[P_2Se_6^{2-}]$, or an $Se_z$ ($6 <z<12$) chain forming a glassy compound.

4. A nonlinear optic or ferroelectric article comprising the glassy or crystal compound of claim 1.

5. The glassy or crystal compound of claim 1, wherein the glassy or crystal compound exhibits second harmonic generation in the infrared.

6. The glassy or crystal compound of claim 1, wherein the glassy or crystal compound exhibits difference frequency generation in the visible and infrared.

7. The glassy or crystal compound of claim 1, wherein the glassy or crystal compound is in the form of an optical fiber.

8. The glassy or crystal compound of claim 1, wherein the glassy or crystal compound is in the form of a thin film.

9. The article of claim 4, wherein the article is a waveguide.

10. The article of claim 4, wherein the glass or crystal compound exhibits second harmonic generation in the infrared and the article is a frequency converter.

11. The article of claim 4, wherein the glassy or crystal compound exhibits difference frequency generation in the visible and infrared and the article is a wave-mixer.

* * * * *

UNITED STATES PATENT AND TRADEMARK OFFICE
CERTIFICATE OF CORRECTION

PATENT NO. : 8,143,181 B2  
APPLICATION NO. : 12/436409  
DATED : March 27, 2012  
INVENTOR(S) : Mercouri G. Kanatzidis et al.

Page 1 of 1

It is certified that error appears in the above-identified patent and that said Letters Patent is hereby corrected as shown below:

IN THE CLAIMS

Col. 19, line 8 (claim 1)
Delete "$0 \leqq x \leqq 1$" and replace with -- $0 \leqq x < 1$ --

Col. 19, line 13 (claim 2)
Delete "$A_1A'_xPSe$" and replace with -- $A_{1-x}A'_xPSe_z$ --

Signed and Sealed this  
Third Day of July, 2012

David J. Kappos  
*Director of the United States Patent and Trademark Office*